United States Patent
Li

(10) Patent No.: US 8,674,257 B2
(45) Date of Patent: Mar. 18, 2014

(54) AUTOMATIC FOCUS AND EMISSIVITY MEASUREMENTS FOR A SUBSTRATE SYSTEM

(75) Inventor: Jiping Li, Palo Alto, CA (US)

(73) Assignee: Applied Materials, Inc., Santa Clara, CA (US)

(*) Notice: Subject to any disclaimer, the term of this patent is extended or adjusted under 35 U.S.C. 154(b) by 1582 days.

(21) Appl. No.: 12/029,403

(22) Filed: Feb. 11, 2008

(65) Prior Publication Data

US 2009/0200279 A1 Aug. 13, 2009

(51) Int. Cl.
B23K 26/00 (2006.01)

(52) U.S. Cl.
USPC ............ 219/121.66; 219/121.65; 219/121.73; 219/121.76; 219/121.85

(58) Field of Classification Search
USPC ............... 219/121.6, 121.65, 121.66, 121.76, 219/121.78; 438/795, 799
See application file for complete search history.

(56) References Cited

U.S. PATENT DOCUMENTS

| | | | | |
|---|---|---|---|---|
| 4,234,356 A * | 11/1980 | Auston et al. | | 438/799 |
| 5,304,357 A * | 4/1994 | Sato et al. | | 118/50.1 |
| 5,357,365 A * | 10/1994 | Ipposhi et al. | | 359/205.1 |
| 5,660,746 A * | 8/1997 | Witanachchi et al. | ... | 219/121.66 |
| 5,803,965 A * | 9/1998 | Yoon | | 117/4 |
| 6,208,673 B1 * | 3/2001 | Miyake | | 372/22 |
| 6,987,240 B2 | 1/2006 | Jennings et al. | | |
| 7,005,601 B2 | 2/2006 | Jennings | | |
| 7,078,651 B2 | 7/2006 | Jennings | | |
| 7,148,159 B2 * | 12/2006 | Talwar et al. | | 438/795 |
| 2005/0045604 A1 | 3/2005 | Talwar et al. | | |
| 2005/0067384 A1 * | 3/2005 | Talwar et al. | | 219/121.6 |
| 2006/0102607 A1 | 5/2006 | Adams et al. | | |
| 2006/0234458 A1 * | 10/2006 | Jennings et al. | | 438/308 |
| 2006/0252282 A1 * | 11/2006 | Talwar et al. | | 438/795 |
| 2007/0072400 A1 * | 3/2007 | Bakeman | | 438/487 |
| 2007/0237475 A1 | 10/2007 | Morita et al. | | |
| 2007/0243721 A1 | 10/2007 | Autryve et al. | | |
| 2008/0041831 A1 | 2/2008 | Jennings et al. | | |

* cited by examiner

Primary Examiner — Mark Paschall
(74) Attorney, Agent, or Firm — Patterson & Sheridan, LLP

(57) ABSTRACT

An apparatus for thermally processing a substrate includes a first radiation source configured to heat a substrate and emit radiation at a heating wavelength, focusing optics configured to direct radiation from the first radiation source to the substrate, and a second radiation source configured to emit radiation at a second wavelength different from the heating wavelength and at a lower power than the first radiation source. Radiation from the second radiation source is directed onto the substrate. The apparatus further includes a first detector configured to receive reflected radiation at the second wavelength and a computer system configured to receive an output from the first detector and adjust a focus plane of the first radiation source relative to the substrate. The second radiation source is configured to have substantially the same focus plane as the first radiation source.

21 Claims, 17 Drawing Sheets

AUTOMATIC FOCUS AND EMISSIVITY MEASUREMENTS FOR A SUBSTRATE SYSTEM

BACKGROUND OF THE INVENTION

1. Field of the Invention

Embodiments of the invention generally relate to thermal processing of substrates, and, more specifically, to apparatus and methods for automatically focusing energy onto and measuring emissivity of a substrate during thermal processing.

2. Description of the Related Art

During electronic device fabrication, substrates may be heated to high temperatures so that various chemical and/or physical reactions can take place. Thermal processes are usually used to heat the substrates. A typical thermal process, such as annealing, requires providing a relatively large amount of thermal energy to the substrate in a short amount of time, and thereafter rapidly cooling the substrate to terminate the thermal process. Examples of thermal processes currently in use include Rapid Thermal Processing (RTP) and impulse (spike) annealing. While such processes are widely used, current technology tends to ramp the temperature of the substrate too slowly and expose the substrate to elevated temperatures for too long. These problems become more severe with increasing substrate sizes, increasing switching speeds, and/or decreasing feature sizes.

In general, these thermal processes heat substrates under controlled conditions according to a predetermined thermal recipe. These thermal recipes typically consist of a temperature that the semiconductor substrate must be heated to, the rate of change of temperature (i.e., the temperature ramp-up and ramp-down rates), and the time that the thermal processing system remains at a particular temperature (sometimes referred to as "dwell time"). For example, thermal recipes may require the substrate to be heated from room temperature to temperatures of 1200° C. or more, for processing times at each temperature ranging up to 60 seconds, or more.

Moreover, to meet certain objectives, such as minimal inter-diffusion of materials between different regions of a substrate, the amount of time that each substrate is subjected to high temperatures must be restricted. To accomplish this, the temperature ramp rates, both up and down, are preferably high. In other words, it is desirable to be able to adjust the temperature of the substrate from a low to a high temperature, or vice versa, in as short a time as possible.

The requirement for high temperature ramp rates led to the development of Rapid Thermal Processing (RTP), where typical temperature ramp-up rates range from 200 to 400° C./s, as compared to 5-15° C./minute for conventional furnaces. Typical ramp-down rates are in the range of 80-150° C./s. A drawback of RTP is that it heats the entire substrate even though the integrated circuit (IC) devices reside only in the top few microns of the silicon substrate, which limits how fast one can heat up and cool down the substrate. Moreover, once the entire substrate is at an elevated temperature, heat can only dissipate into the surrounding space or structures. As a result, today's state of the art RTP systems struggle to achieve a 400° C./s ramp-up rate and a 150° C./s ramp-down rate.

FIG. 1 is a graph 100 of thermal profiles of different prior art thermal processes. As can be seen, the thermal profile 102 of a typical RTP system has a 250° C./s ramp-up rate and a 90° C./s ramp-down rate.

A drawback of RTP is that it heats the entire substrate even though the IC devices reside only in the top few microns of the substrate. The heating of the entire substrate limits how fast one can heat up and cool down the substrate. Moreover, once the entire substrate is at an elevated temperature, heat can only dissipate into the surrounding space of structures. As a result, today's state of the art RTP systems struggle to achieve 400° C./s ramp-up rates and 90° C./s ramp-down rates.

FIG. 1 also shows a thermal profile 104 of a laser annealing process. Laser annealing is used during the fabrication of thin film transistor (TFT) panels. Such systems use a laser spot to melt and recrystallize polysilicon. The entire TFT panel is exposed by scanning the laser spot across successive exposure fields on the panel. For substrate applications, a laser pulse is used to illuminate an exposure field for a duration of approximately 20-40 ns, where the exposure field is obtained by rastering across and down the substrate.

One laser annealing technique is known as dynamic surface annealing (DSA). In general, this technique delivers a constant energy flux to a small region on the surface of the substrate while the substrate is translated, or scanned, relative to the energy delivered to the small region. Due to the stringent uniformity requirements and the complexity of minimizing the overlap of scanned regions across the substrate surface, these types of processes may not be effective for thermal processing contact level devices formed on the surface of the substrate.

Pulsed laser anneal techniques, generally project pulsed electromagnetic energy at one small region on a substrate, and then move the substrate relative to the energy source and expose other small regions to pulsed electromagnetic energy. The pulsed laser anneal technique minimizes overlap between processing regions on the substrate, thereby improving thermal annealing uniformity. The energy sources used in the pulsed laser anneal techniques must be able to deliver a relatively large amount of energy at a relatively short time period.

Laser annealing techniques require the laser energy to be focused onto the substrate for optimal heating. Focusing the laser typically occurs at the initial setup, not during the thermal processing of each substrate. As a result, various factors may cause the laser to be slightly out of focus, which can cause non-uniform annealing of the substrate. For example, each substrate may be slightly tilted, causing different portions of the substrate to have different locations with respect to the focus plane of the laser. Individual substrates may vary in thickness by ±50 μm. The location of the focus plane may vary as a result of heating in the optical components.

Variations in emissivity of the substrate may affect the uniformity of the annealing of the substrate. An absorption layer is deposited on a substrate before thermal processing so that the substrate will absorb heat from the laser. The absorption layer may vary in composition and thickness, which can cause corresponding variations in emissivity. As a result, the amount of heat absorbed by the substrate from the laser will vary, resulting in non-uniform annealing of the substrate. If a pyrometer is used to measure temperature, variations in emissivity at a wavelength monitored by the pyrometer will affect temperature readings, potentially causing errors in temperature control.

In view of the above, laser annealing processes may be improved by correcting for the effects of variations in substrate and laser properties.

SUMMARY OF THE INVENTION

In one aspect, embodiments of the invention relate to an apparatus for thermally processing a substrate. The apparatus includes a first radiation source configured to heat a substrate and emit radiation at a heating wavelength, focusing optics configured to direct laser radiation from the first laser radiation source to the substrate, and a second laser radiation source configured to emit laser radiation at a second laser wavelength different from the heating wavelength and at a lower power than the first laser radiation source. Laser radiation from the second laser radiation source is directed onto the substrate. The apparatus further includes a first detector configured to receive reflected laser radiation at the second laser wavelength and a computer system configured to receive an output from the first detector and adjust a focus plane of the first laser radiation source relative to the substrate. The second laser radiation source is configured to have substantially the same focus plane as the first laser radiation source.

In another aspect, embodiments of the invention relate to a method of thermally processing a substrate. The method includes directing radiation at a first wavelength from a heating radiation source onto a substrate and directing radiation at a second wavelength from a low power radiation source onto the substrate. A focus plane of the low power radiation source corresponds to a focus plane of the heating radiation source. The method further includes measuring reflected radiation at the second wavelength reflected off the substrate and adjusting the position of a focus plane of the heating radiation source relative to the substrate in response to the measured reflected radiation at the second wavelength.

In another aspect, embodiments of the invention relate to an apparatus for thermally processing a substrate. The apparatus includes a first radiation source configured to heat a substrate and emit radiation at a heating wavelength, a second laser radiation source configured to emit radiation at a second wavelength close to but not the same as the heating wavelength and at a lower power than the first radiation source, focusing optics configured to direct radiation from the first radiation source and the second radiation source to the substrate, an aperture plate, a first detector configured to receive reflected radiation at the second wavelength after passing through the aperture plate, and a computer system configured to receive an output from the first detector and adjust a focus plane of the first radiation source relative to the substrate. The second radiation source is configured to have substantially the same focus plane as the first radiation source.

BRIEF DESCRIPTION OF THE DRAWINGS

So that the manner in which the above recited features of the present invention can be understood in detail, a more particular description of embodiments of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally relate to thermal processing of substrates, and, more specifically, to apparatus and methods for automatically focusing radiation onto a substrate during thermal processing.

Figure 1:
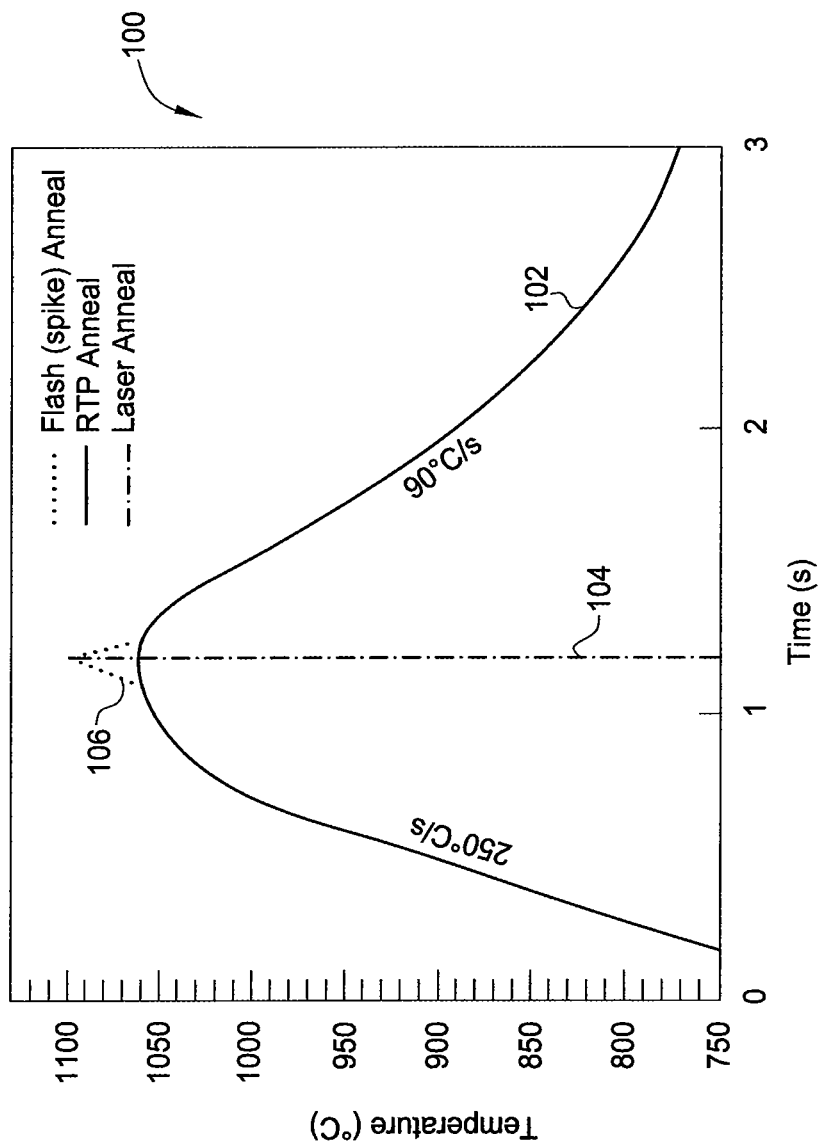
FIG. 1 is a graph of thermal profiles of different prior art thermal processes.
Figure 2A:
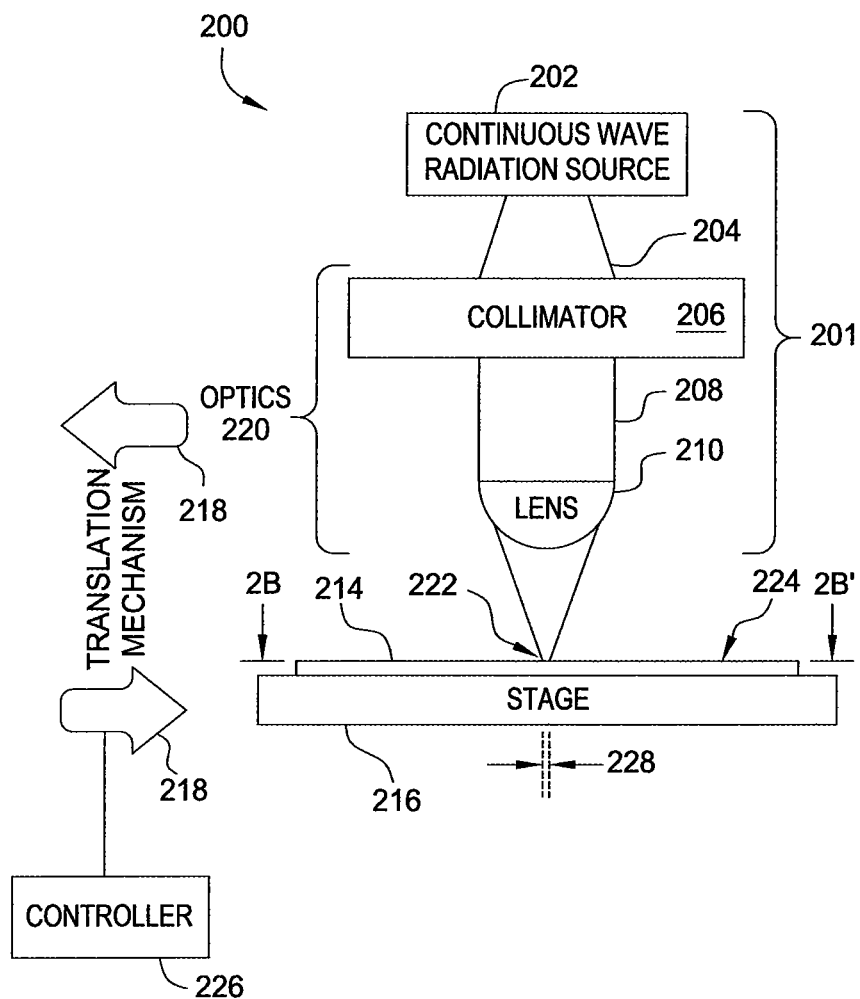
FIG. 2A is a side view of an apparatus for thermally processing a substrate in accordance with an embodiment of the invention.

FIG. 2A is a side view of an apparatus 200 for thermally processing a substrate, according to an embodiment of the invention. Thermally processing a substrate means conducting any thermal process that requires the characteristics of the invention described below. Embodiments of such a thermal process may include thermal annealing of substrates or thermal processes used in chemical vapor deposition (CVD), both of which will be described throughout the remainder of the figures.

The apparatus 200 comprises a continuous wave electromagnetic radiation module 201, a stage 216 configured to receive a substrate 214 thereon, and a translation mechanism 218. The continuous wave electromagnetic radiation module 201 comprises a continuous wave electromagnetic radiation source 202 and focusing optics 220 disposed between the continuous wave electromagnetic radiation source 202 and the stage 216.

In one embodiment, the substrate 214 is any suitable substrate, such as a single crystal silicon substrate; silicon on insulator (SOI); silicon germanium or alloys thereof, glass or quartz substrate with a silicon layer thereon, as used for manufacturing thin film transistors (TFT); or the like. It will, however, be appreciated that thermal flux processing of single crystal silicon substrates is more difficult than that of TFT substrates, as single crystal silicon substrates have a much higher thermal conductivity than TFTs and require tighter control of the thermal process for the applications in which the single crystal silicon substrates are used.

The continuous wave electromagnetic radiation source 202 is capable of emitting "continuous waves" or rays of electromagnetic radiation, such as light. By "continuous wave" it is meant that the radiation source is configured to emit radiation continuously, not as a burst, pulse, or flash of radiation. This is quite unlike lasers used in laser annealing, which typically use a burst or flash of light.

Furthermore, as the continuous wave electromagnetic radiation needs to be absorbed at or near the surface of the substrate, the radiation has a wavelength within the range at which the substrate absorbs radiation. In the case of a silicon substrate, the continuous wave electromagnetic radiation may have, for example, a wavelength between 190 nm and 950 nm. In one embodiment, the wavelength is approximately 810 nm.

Alternatively, a high power continuous wave electromagnetic radiation laser source operation in or near the UV may be used. Wavelengths produced by such continuous wave electromagnetic radiation laser sources are strongly absorbed by most otherwise reflective materials.

In one embodiment, the continuous wave electromagnetic radiation source 202 is capable of emitting radiation continuously for at least 15 seconds. Also, in one embodiment, the continuous wave electromagnetic radiation source 202 comprises multiple laser diodes, each of which produces uniform and spatially coherent light at the same wavelength. The power of the laser diode(s) is in the range of 0.5 kW to 50 kW. In one embodiment, the power of the laser diode(s) is approximately 5 kW. Suitable laser diodes are made, for example, by Coherent Inc. of Santa Clara, Calif.; Spectra-Physics of California; or by Cutting Edge Optronics, Inc. of St. Charles, Mo.

The focusing optics 220 may include one or more collimators 206 to collimate radiation 204 from the continuous wave electromagnetic radiation source 202 into a parallel beam 208. This collimated radiation 208 is then focused by at least one lens 210 into a line of radiation 222 at an upper surface 224 of the substrate 214.

Lens 210 is any suitable lens, or series of lenses, capable of focusing radiation into a line. In one embodiment, lens 210 is a cylindrical lens. Alternatively, lens 210 may be, for example, one or more concave lenses, convex lenses, plane mirrors, concave mirrors, convex mirrors, refractive lenses, diffractive lenses, Fresnel lenses, or gradient index lenses. The focusing optics 220 is described in further detail below in relation to FIG. 11.

The stage 216 is any platform or chuck capable of securely holding the substrate 214 during translation, as explained below. In one embodiment, the stage 216 includes a substrate gripper (not shown), such as a frictional, gravitational, mechanical, or electrical system. Examples of suitable substrate grippers include mechanical clamps, electrostatic or vacuum chucks, or the like.

The apparatus 200 also comprises a translation mechanism 218 configured to translate the stage 216 and the line of radiation 222 relative to one another. In one embodiment, the translation mechanism 218 is coupled to the stage 216 to move the stage 216 relative to the continuous wave electromagnetic radiation source 202 and/or the focusing optics 220. In another embodiment, the translation mechanism is coupled to both the continuous wave electromagnetic radiation source 202 and the focusing optics 22 to move the continuous wave electromagnetic radiation source 202 and/or the focusing optics 220 relative to the stage 216. In yet another embodiment, the translation mechanism 218 moves the continuous wave electromagnetic radiation source 202, the focusing optics 220, and the stage 216. Any suitable translation mechanism may be used, such as a conveyor system, rack and pinion system, or the like.

The translation mechanism 218 may be coupled to a controller 226 to control the scan speed at which the stage 216 and the line of radiation 222 move relative to one another. In addition, translation of the stage 216 and the line of radiation 222 relative to one another may be along a path perpendicular to the line of radiation 222 and parallel to the upper surface 224 of the substrate 214. In a one embodiment, the translation mechanism 218 moves at a constant speed. The constant speed may be, for example, approximately 2 cm/s for a 35 micron wide line. In another embodiment, the translation of the stage 216 and the line of radiation 222 relative to one another is not along a path perpendicular to the line of radiation 222.

Figure 2B:
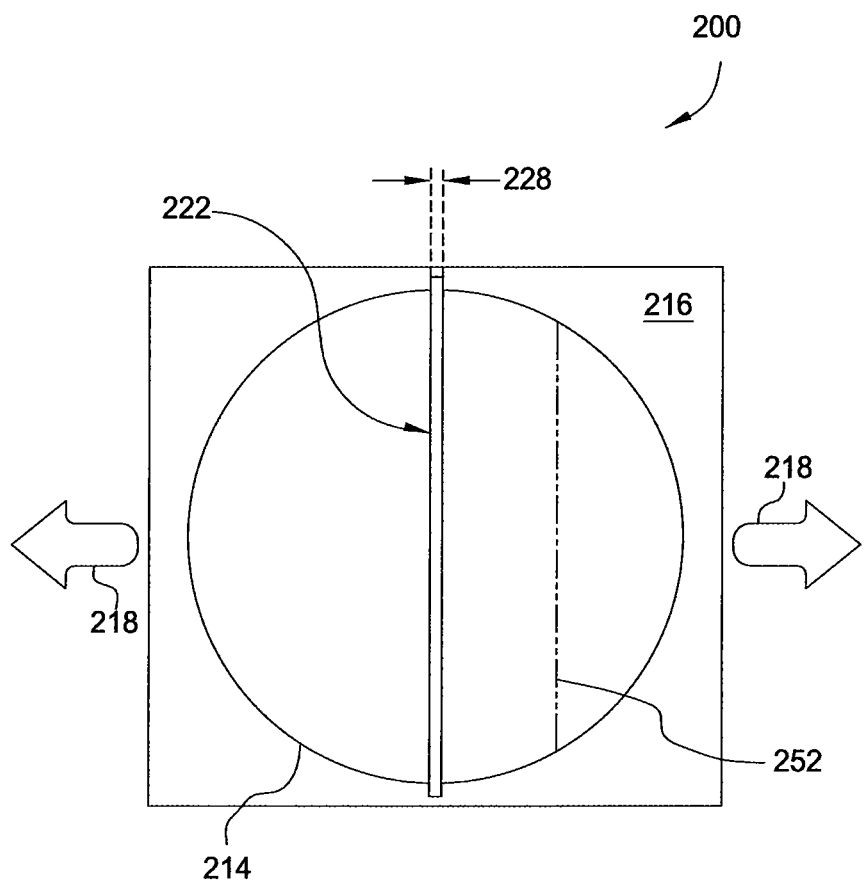
FIG. 2B is a top view of the substrate and the stage shown in FIG. 2A.

FIG. 2B is a schematic top view of the substrate and stage, as taken along line 2B-2B' of FIG. 2A. In one embodiment, the substrate 214 is a circular substrate with a diameter of about 200 or about 300 mm, and a thickness of about 750 microns. The line of radiation 222 extends across the substrate 214. The line of radiation 222 may have a width 228 of between about 3 and about 500 microns. In one embodiment, the line of radiation 222 has a length that extends across the entire diameter or width of the substrate and has a width 228 of approximately 35 microns. The width is measured at half the maximum intensity of the radiation (otherwise knows as Full Width Half Max (FWHM)). In one embodiment, the line of radiation 222 linearly traverses the substrate 214, such that the line 222 is perpendicular to the direction of the movement, i.e., the line 222 remains parallel to a fixed line or chord 252 of the substrate that is perpendicular to the direction of the movement at all times.

The power density at the line of radiation may be, for example, between 10 kW/cm$^2$ and 200 kW/cm$^2$ with a nominal range near 60 kW/cm$^2$. It is not readily achievable to radiate the entire surface of a substrate at these power densities, but it is possible to scan across the substrate a line of radiation that has this intensity. For example, an experiment using a 400 microns wide line of radiation with a peak power density of 70 kW/cm$^2$ scanned at 100 cm/s heated the surface of a substrate to approximately 1170° C. with ramp-up and ramp-down rates exceeding 4 million° C./s.

Figure 3:
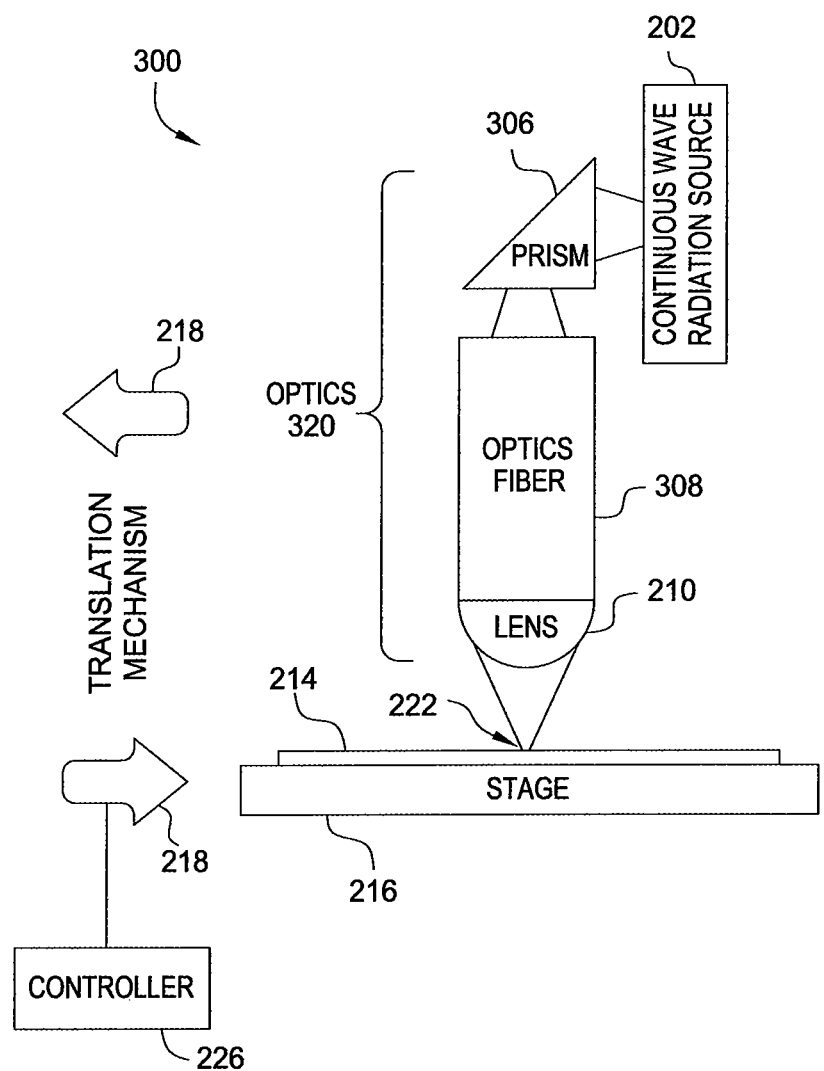
FIG. 3 is a side view of another apparatus for thermally processing a substrate in accordance with an embodiment of the invention.

FIG. 3 is a schematic side view of another apparatus 300 for thermally processing a substrate, according to another embodiment of the invention. This embodiment shows another arrangement of focusing optics 320. In this embodiment, the focusing optics 320 comprise a lens 210 and one or more radiation guides, such as an optical fiber 308 and a prism 306. Other radiation guides such as a waveguide, mirror, or diffuser may also be used.

Radiation from the continuous wave electromagnetic radiation source 202 is directed at one or more prisms 306, which redirect the radiation towards one or more optical fibers 308. Radiation is transmitted through the optical fibers 308 towards the lens 210, where it is focused into a line of radiation 222.

It will be appreciated that many different combinations of the aforementioned focusing optics 220 (FIG. 2A) or 320 may be used to transmit and focus the radiation from the continuous wave electromagnetic radiation source into a line of radiation. In addition, a linear array of laser diodes could be used as the radiation source 202. Any suitable means for producing a uniform radiation distribution, such as a radiation diffuser, may be used in conjunction with the radiation source 202.

Figure 4:
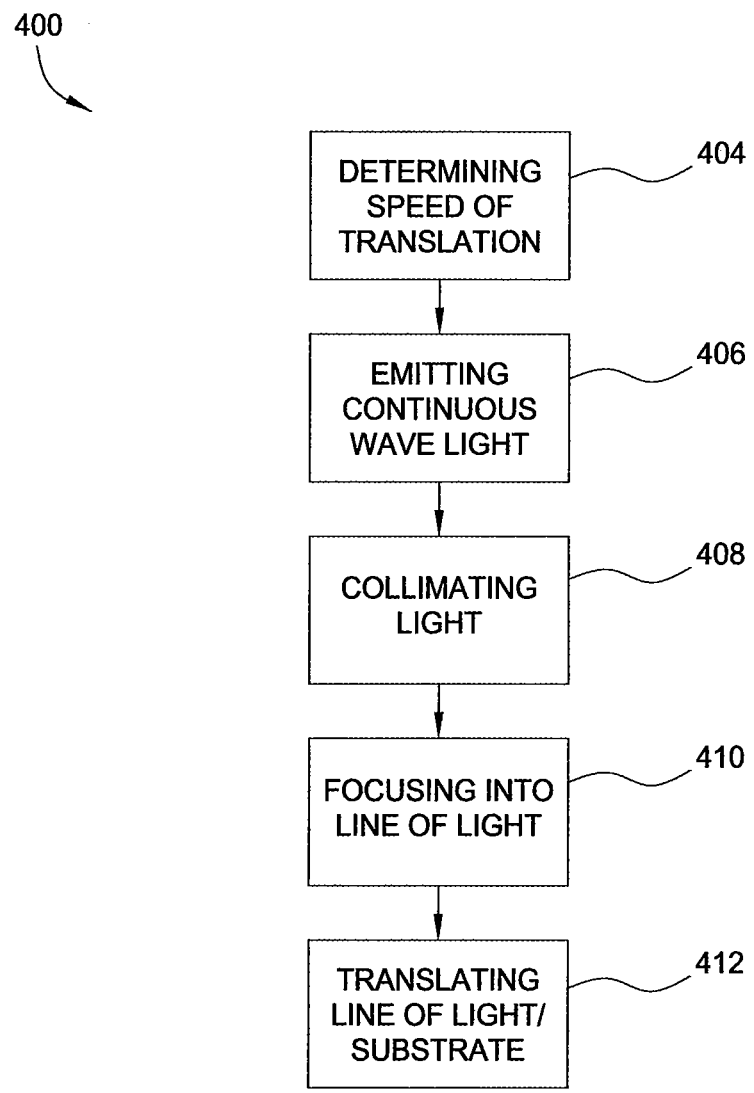
FIG. 4 is a flow chart of a method for thermally processing a substrate in accordance with an embodiment of the invention.

FIG. 4 is a flow chart 400 of a method for thermally processing a substrate 214 (FIG. 2A). The method can be performed using an apparatus as described above in relation to FIGS. 2A, 2B, and 3. The controller 226 determines, at step 404, the scan speed at which the line of radiation 222 and the substrate will move relative to one another. This determination is based on the thermal recipe for processing the substrate, the substrate properties, the power of the continuous wave electromagnetic radiation source, the width of the line of radiation, the power density at the line of radiation, or the like process characteristics.

The continuous wave electromagnetic radiation source 202 (FIG. 2A) emits a continuous wave of light 204, at step 406. This radiation 204 may be collimated into a beam of radiation 208, at step 408. The collimated beam of radiation 208 is focused into a line of radiation 222, at step 410. In accordance with the predetermined scan speed, the stage 216 and the line of radiation 222 are translated, at step 412, relative to one another by the translation mechanism 218. The translation is performed along a path perpendicular to the line of radiation 222 and parallel to the upper surface of the substrate, such that the line of radiation traverses the entire substrate 214. In one embodiment, the translation mechanism 218 scans the radiation source and focusing optics over the upper surface of the substrate at approximately 2 cm/s.

Figure 5:
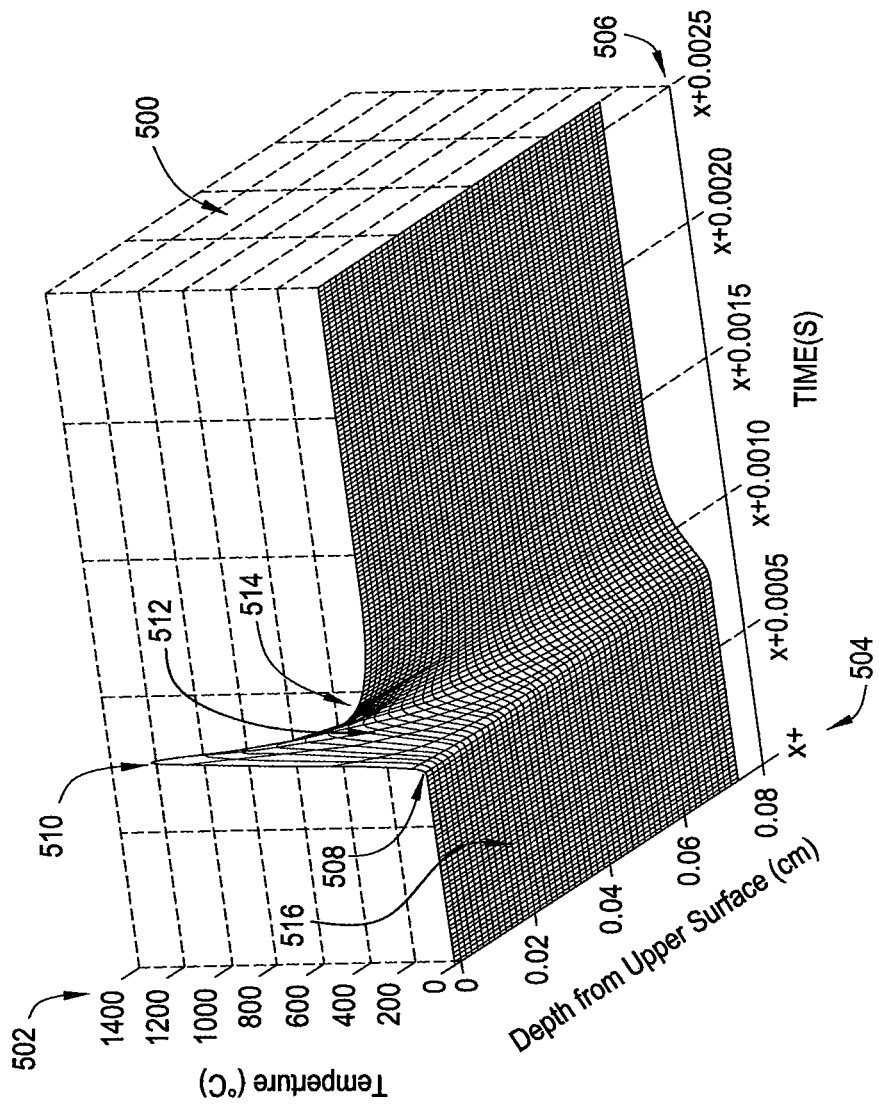
FIG. 5 is a graph of the temperature at a fixed point on and through the substrate during thermal processing in accordance with an embodiment of the invention.

FIG. 5 is a graph 500 of the temperature versus time and depth at a fixed point on and through the substrate during thermal processing performed according to the method described above in relation to FIG. 4. A temperature axis 502 indicates a temperature of between 0 and 1400° C. at the fixed point. Axis 504 indicates a depth from the upper surface 224 (FIG. 2B) into the substrate 214 (FIG. 2B) at the fixed point. Axis 506 indicates the time in seconds at some point after the start of scanning. The fixed point is assumed to be located at 508.

As the line of radiation 222 (FIG. 2B) scans across the upper surface 224 of the substrate 214, it subjects a line or chord on the substrate to the heat it generates. Before the line of radiation reaches the fixed point, the temperature at the fixed point, both at the upper surface 224 and throughout a substrate cross-section at the fixed point, is ambient temperature, as indicated by reference numeral 516. As soon as the line of radiation reaches the fixed point at 508, the temperature at the upper surface ramps up to a process temperature, such as 1200° C. (or other desired temperature necessary for the process), at approximately 1e6 C/s, as shown by reference numeral 510. At the same time, the substrate acts as a heat sink resulting in a dramatic drop-off in temperature away from the surface, as indicated by reference numeral 512. For example, as shown in FIG. 5, at 0.04 cm from the point on the upper surface, the temperature is approximately 200° C. Thus, the heating effect is generally localized to the upper surface only. This is extremely advantageous, as generally only the regions near the upper surface 224 of the substrate require thermal processing.

As the line of radiation passes over and away from the fixed point, the temperature drops rapidly, as shown at reference numeral 514. Again, this is because the substrate acts as a heat sink diffusing the heat at the upper surface throughout the remainder of the cooler substrate. This is not possible with prior art thermal systems, such as RTP, that simultaneously heat the entire substrate. In RTP, the entire substrate is subjected to an elevated temperature and, therefore, cannot easily dissipate the heat to a cooler region. In fact, no comparison can be made to RTP on the time scale shown in FIG. 5, because a superimposed RTP graph would yield an almost flat plane at 1100° C. extending for about one second. One second is about 400 times greater than the time period illustrated in FIG. 5.

Therefore, unlike prior art processes, embodiments of the invention can heat a substrate 214 with a predetermined power density and for a short predetermined length of time (approximately 1 millisecond), such that the surface of the substrate 224 is heated from an ambient temperature ($T_A$) of, for example, less than 500° C., to a process temperature ($T_P$) of, for example, above 700° C. At the same time, the temperature at the predetermined depth ($T_D$) from the surface remains below the ambient temperature, plus half the process temperature less the ambient temperature, i.e., $T_D \leq T_A + (T_P - T_A)/2$. The predetermined depth is approximately ten times the depth of interest, i.e., ten times the maximum depth of device structures in silicon. In a typical silicon substrate, the maximum depth of the device structure is about 3 microns.

Transfer of heat to the bulk of the substrate promotes homogenous thermal exposure, as heat has enough time to diffuse from a locally strong heat absorbing region to a lower heat absorbing region. In addition, pattern density effects are comparable to RTP. Advantageously, the time scale is short enough to limit the diffusion depth of the heat transfer to several microns, as opposed to the several hundred-micron thickness of the substrate in a typical RTP, thereby greatly reducing the total required power. Since the bulk of the substrate is not appreciably heated, it provides an ideal heat sink for the temperature ramp down.

One concern of prior art laser annealing systems regards stress related defects caused by rapidly heating relatively small areas of a substrate. Therefore, experimentation was undertaken to test whether the thermal flux processing of the present invention causes any stress related defects in the substrate. Peak stress occurs near the max temperature gradient, not the max temperature. If a line of radiation is suitably narrow and the depth of heating suitably shallow, it is possible to displace the region of maximum thermal gradient from the region of highest temperature, thereby increasing the slip window and decreasing defects. During this experiment, a sample was scanned at 20 cm/s under a 400 micron wide line of radiation with a peak power density of 60 kW/cm$^2$. The present invention was able to displace the peak thermal gradient from the peak temperature, thus enabling Ultra Shallow Junction (USJ) formation suitable for the 70 nm node with a 1 keV Boron implant without introducing any dislocations. Only the typical implant related defects were observed.

Figure 6:
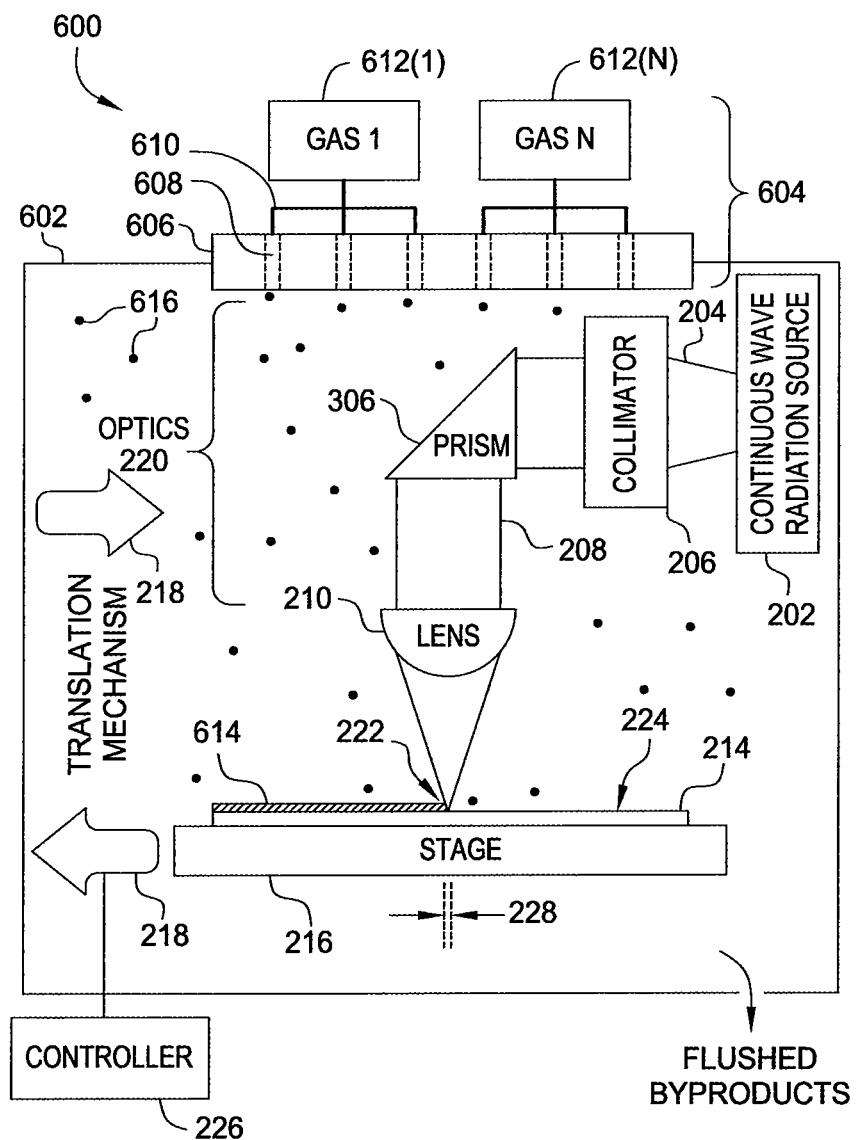
FIG. 6 is a schematic side view of an apparatus for depositing layers on a substrate in accordance with an embodiment of the invention.

FIG. 6 is a schematic side view of an apparatus 600 for depositing layers on a substrate, according to another embodiment of the invention. The apparatus 600 is similar to the apparatus 200 shown in FIGS. 2A and 2B, and apparatus 300 shown in FIG. 3. Components having the same reference numerals are the same as those shown in FIGS. 2A and 2B. The apparatus 600 may also be used to perform deposition processes, such as CVD, ALD, or the like.

In addition to the components described above in relation to FIGS. 2A, 2B and 3, apparatus 600 shows a reaction chamber 602, in which many of the components are housed. At least one injector 604 is used to introduce or inject one or more gases 616 into reaction chamber 602. The gas injector 604 may comprise one or more gas sources 612(1)-(N) fluidly coupled by ducts 610 to one or more gas inlets 608 in a gas manifold 606. The gas injector 604 may be located at any suitable location within the reaction chamber 602. For example, gas may be injected at the side of the reaction chamber and flow across the surface of the substrate orthogonally to the direction of relative motion between the line of radiation and the surface of the substrate, or gas may be injected from above the substrate, as shown.

In the embodiment shown in FIG. 6, continuous wave electromagnetic radiation is collimated by the collimator, redirected towards the substrate by the prism 306, and focused into a line 222 by the lens 210. It should, however, be appreciated that the focusing optics 220 may comprise any suitable focusing optics capable of focusing a line of energy onto the upper surface 224 of the substrate 214, as described above. Further, it should be appreciated that the focusing optics may be placed outside of the chamber, where radiation passes into the chamber via a transparent window. Still further, the chamber and/or gas sources may take on any suitable shape and/or configuration.

Figure 7:
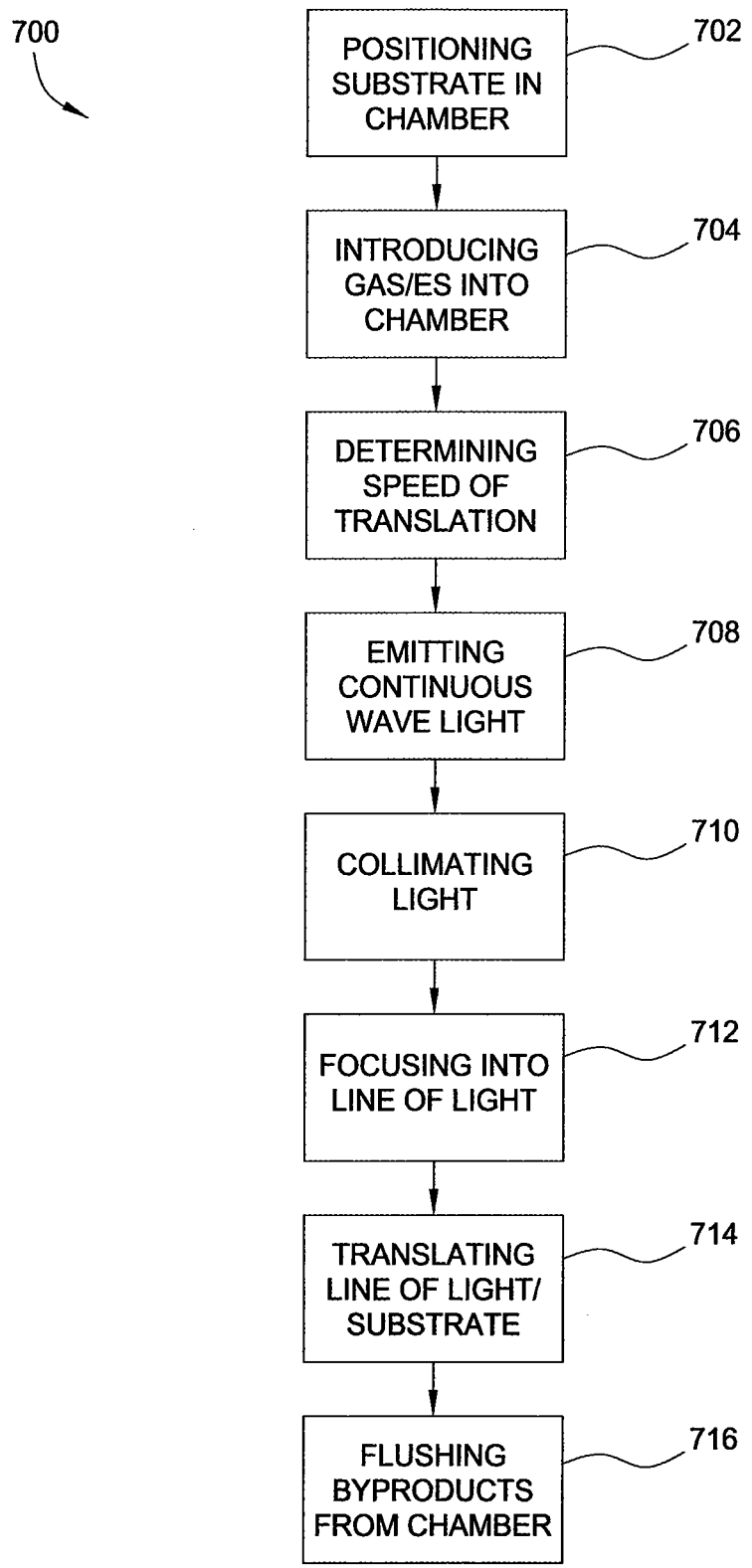
FIG. 7 is a flow chart of a method for depositing layers on a substrate, according to the embodiment of the invention shown in FIG. 6.

FIG. 7 is a flow chart 700 of a method for depositing one or more layers on a substrate, according to the embodiment of the invention shown in FIG. 6. A substrate is positioned in the reaction chamber, at 702. One or more gases such as ammonia ($NH_3$) and dichlorosilane (DCS), containing the atoms or molecules required in layer 614 are then introduced at 704 into the reaction chamber containing the substrate.

A predetermined speed for translating a line of radiation, as described below, is determined at 706. This predetermined speed is based on a number of factors, such as a thermal recipe for processing the substrate, the properties of the substrate, a power of the continuous wave electromagnetic radiation, a width of the line of radiation, a power density at the line of radiation, or the like. In one embodiment, this predetermined speed is approximately 2 cm/s.

Continuous wave electromagnetic radiation is then emitted at 708 from a continuous wave electromagnetic radiation source, as described above. The continuous wave electromagnetic radiation may be collimated at 710 by the collimator 206. The continuous wave electromagnetic radiation is subsequently focused at 712 into a line of radiation 222 extending across the upper surface 224 of the substrate. In one embodiment, the width 228 of the line of radiation is approximately 35 microns wide. The line of radiation is then translated at 714 relative to the surface at the constant predetermined speed, determined above. This translation is undertaken by the translation mechanism under control of the controller.

The combination of the introduced gas(es) 616 and heat generated by the line of radiation causes at least one gas 616 to react and deposit a layer 614 on the surface of the substrate. This reaction may be a chemical reaction between gases, a decomposition of one or more gases, or the like. Undesirable byproducts of the reaction are then flushed from the reaction chamber at 716.

This process is repeated until a layer 614 having a predetermined thickness is formed on the upper surface 224 of the substrate 214. Typically, each deposited layer is between 8-10 Angstroms. Required films/layers vary from 20 Angstroms for tunnel oxide used in flash memory to 1500 Angstroms for spacer applications. Accordingly, the scan speed is generally in the range of a few cm/sec to about 1 m/sec.

The chemical reaction is controlled by controlling: the temperature of the substrate surface by adjusting the continuous wave electromagnetic radiation or the line of radiation; the amount and/or ratio of the gas(s) introduced into the reaction chamber; and the pressure within the reaction chamber.

The above described method can heat the substrate surface to any reasonable temperature for a millisecond or less. In addition, as the gas near the surface is heated by the line of radiation, the reaction of the gases only occurs at or near the surface. The heating is very brief as the line keeps moving so only the gas near the surface reacts. Because gas away from the surface never gets hot, undesirable gas phase reactions are prevented. This allows multiple gases to be injected simultaneously without leading to undesirable gas phase reactions away from the substrate surface.

Figure 8:
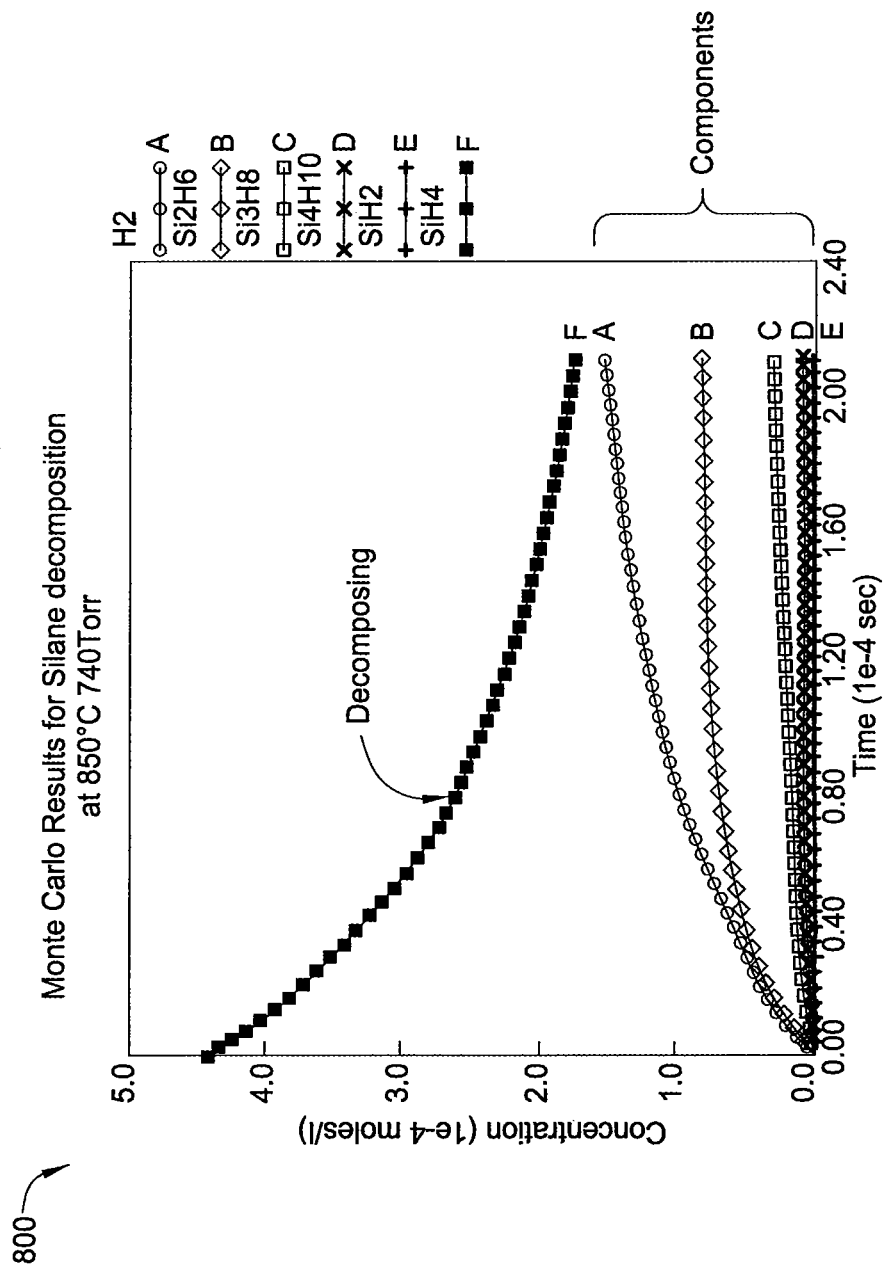
FIG. 8 is a graph of the results of a Monte Carlo simulation for silane decomposition at 850° C. and 740 Torr, according to the embodiment of the invention shown in FIG. 6.

In one embodiment, the above described method is performed at a pressure of between a few Torr to pressures above atmospheric pressure. FIG. 8 depicts the results of a simulation showing that sufficient decomposition of reactants can occur at such pressures on this short time scale. In addition, in one embodiment, the temperature of the line of radiation depends on the film/layer being deposited, but is generally in the range of 600 to 900° C.

FIG. 8 is a graph 800 of the results of a Monte Carlo simulation for silane decomposition at 850° C. and 740 Torr, according to one embodiment of the invention shown in FIG. 6. This simulation at lower pressures duplicates a deterministic model published by Meyerson, Scott and Tsui, Chemtronics 1 (1986) 150, which is hereby incorporated by reference.

This graph 800 shows that a silane, such as dichlorosilane (DCS), decomposes into molecules required for deposition onto the substrate surface. Decomposition occurs at 740 Torr, which is approximately atmospheric pressure, and at a temperature of 850° C. The overall time in which decomposition occurs at this temperature and pressure is approximately $6 \times 10^4$ seconds.

The above described apparatus and method for depositing a layer on a substrate has a number of advantages. For example, the thermal budget of the process is low due to the brief time spent at elevated temperature.

In addition, as the line of radiation only applies heat to the surface of the substrate, the reaction of the gases only occurs at the surface. This leads to a reduction in gas phase transport limitations. This also leads to a reduction in gas phase reactions away from the surface, thereby avoiding undesirable particle formation on the substrate surface. In addition, this method can be performed at atmospheric pressure, resulting in faster decomposition of reactants, such as Silane, thereby enabling high deposition rates.

Figure 9A:
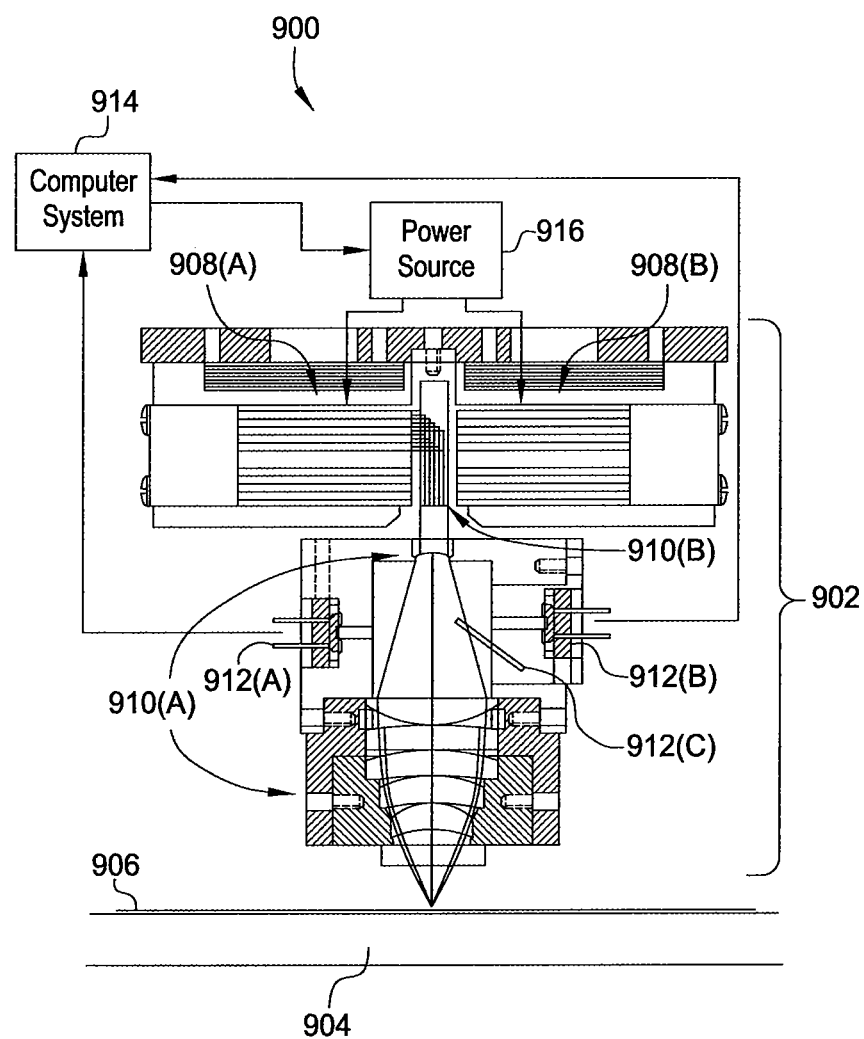
FIG. 9A is a side view of yet another apparatus for thermally processing a substrate in accordance with an embodiment of the invention.

FIG. 9A is a side view of yet another apparatus 900 for thermally processing a substrate, according to yet another embodiment of the invention. The apparatus 900 is similar to the apparatus 200 shown in FIGS. 2A and 2B, the apparatus 300 shown in FIG. 3, and the apparatus 600 shown in FIG. 6. Like-named components are similar, except for any differences described below.

The apparatus 900 comprises a continuous wave electromagnetic radiation module 902, a stage 904 configured to receive a substrate 906 thereon, and a translation mechanism (not shown) for moving the stage 904 and continuous wave electromagnetic radiation module 902 relative to one another. The continuous wave electromagnetic radiation module 902 may include at least one continuous wave electromagnetic radiation source 908A and 908B and optics 910A and 910B disposed between the continuous wave electromagnetic radiation source 908A and 908B and the substrate 906. As described above, the substrate 906 is any suitable substrate, such as a single crystal silicon substrate; silicon on insulator (SOI); Silicon Germanium or alloys thereof, glass or quartz substrate with a silicon layer thereon, as used for manufacturing thin film transistors (TFT); or the like.

Figure 9B:
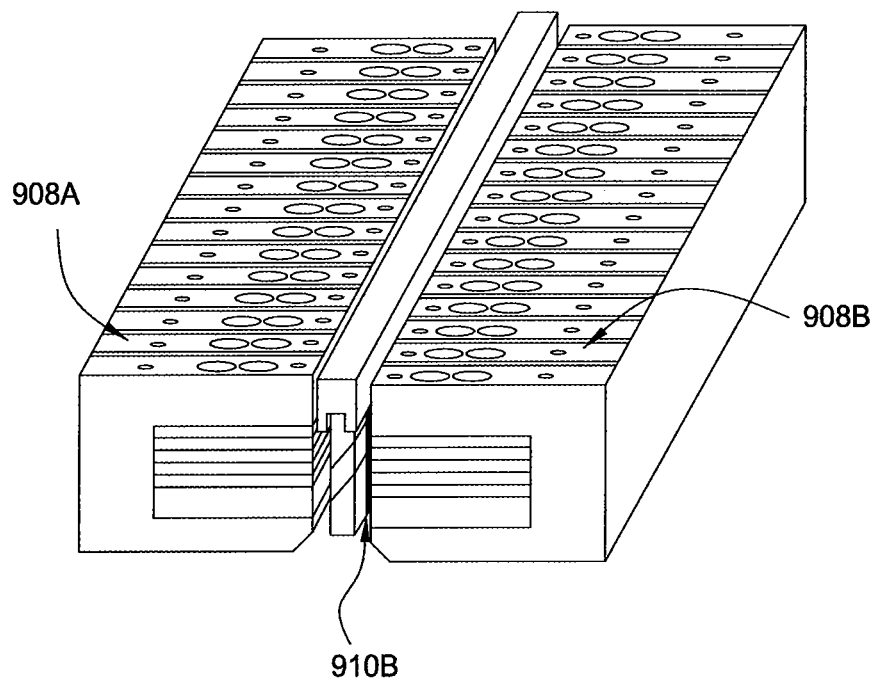
FIG. 9B is an oblique view of the apparatus shown in FIG. 9A.

The continuous wave electromagnetic radiation source 908A and 908B is similar to the continuous wave electromagnetic radiations source 202 described above in relation to FIG. 2A. In one embodiment, the continuous wave electromagnetic radiation source 908A and 908B provides up to 9 kW of radiation focused by the optics 910A and 910B into a line of radiation on the surface of the substrate that is 30 microns wide and at least 300 mm long. Also, in one embodiment, the continuous wave electromagnetic radiation source 908A and 908B includes 15 laser diode modules 908a on one side of the apparatus 900 and 16 laser diode modules 908b on the other side of the apparatus 900. The laser diode modules 908a are staggered in relation to the laser diode modules 908b, as illustrated in FIG. 9B, so that radiation emitted from the laser diode modules 908a interdigitate radiation emitted from the laser diode modules 908b. In addition, in one embodiment, each set of opposing laser diode modules is electrically coupled to one or more power sources 916. Alternatively, each single laser diode module, or combinations of laser diode modules, may be powered by one or more power sources. The power source(s) 916 are electrically coupled to a computer system 914.

In one embodiment, a cooling fluid, such as water, can be circulated within the continuous wave electromagnetic radiation source 908(A+B) to keep it cool. The optics 910A and 910B include focusing optics 910A similar to the focusing optics described above, and an interleave combiner 910B. The interleave combiner 910B is described below in relation to FIG. 10, while the focusing optics 910A are described below in relation to FIG. 11. The apparatus 900 also may include a detection module 912A, 912B, and 912C coupled to the computer system 914, as described below in relation to FIG. 11. The computer system 914 includes instructions and/or procedures for performing the method described below in relation to FIG. 13.

Figure 9C:
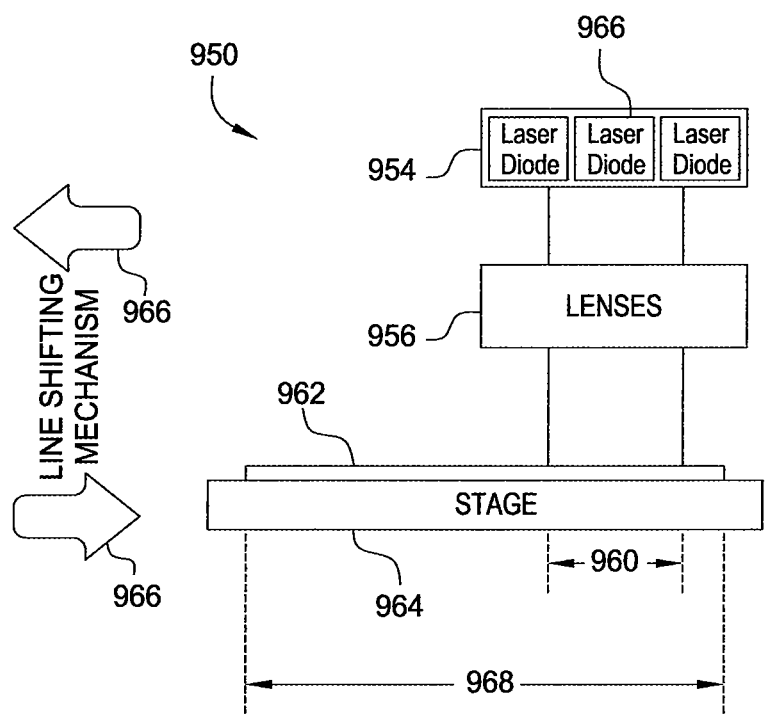
FIG. 9C is a rear view of yet another apparatus for thermally processing a substrate in accordance with an embodiment of the invention.

FIG. 9C is a rear view of another apparatus 950 for thermally processing a substrate 962, according to another embodiment of the invention. In this embodiment, the line of continuous wave electromagnetic radiation does not extend across the entire width of the substrate 962, but rather only partially extends across the diameter or width of the substrate. For example, the line of continuous wave electromagnetic radiation has a length 960, which is less than the diameter or width 968 of the substrate 962.

In use, the line of continuous wave electromagnetic radiation may make more than one scan across the substrate surface. Each successive scan may overlap a previously scanned area, such that thermal exposure uniformity along the length of the line is improved. A line shifting mechanism 966 is used to shift the line of continuous wave electromagnetic radiation and the substrate relative to one another along the length of the line, i.e., substantially collinear with the length of the line and substantially perpendicular to the scan direction. This overlap averages the thermal exposure of all points on the substrate in a similar manner to rotary averaging used in RTP.

To translate the line of continuous electromagnetic radiation relative to the substrate, the line shifting mechanism 966 may translate the continuous wave electromagnetic radiation module (radiation source 954 and the lenses 956). Alternatively, the stage 964 may be translated relative to the line, or both the line and the stage may be translated relative to each other.

Figure 10:
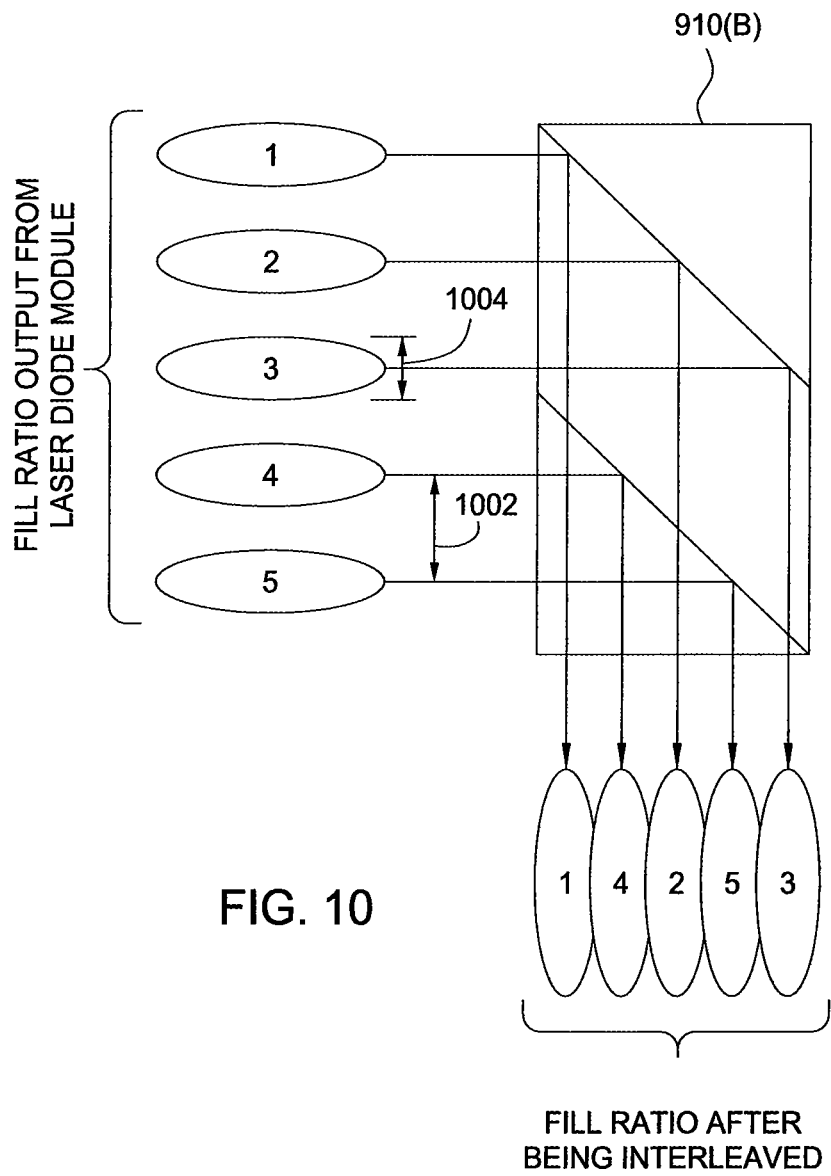
FIG. 10 is a schematic side view of the interleave combiner shown in FIGS. 9A and 9B.

FIG. 10 is a schematic side view of the interleave combiner 910B shown in FIGS. 9A and 9B. The interleave combiner 910B forms part of the optics 910A and 910B and is used to improve the fill ratio of the emitted continuous wave electromagnetic radiation, as explained below. In one embodiment, the interleave combiner 910B is an interleaving prism assembly.

In addition, one embodiment of the apparatus 900 (FIGS. 9A and 9B) includes micro lenses (not shown) to collimate the fast axis output of each laser diode module 908A or 908B. In this particular embodiment, the pitch 1002 of each laser diode module is 2.2 mm, while the aperture 1004 of the fast axis collimating micro lens is 0.9 mm. A fill ratio is the area exposed to continuous wave electromagnetic radiation divided by the total area of the continuous wave electromagnetic radiation module. Therefore, for example, if the lens system provides a beam footprint 1 cm long by 900 microns wide, and the pitch of each laser diode module is 2.2 mm, then the fill ratio is 900 microns/2.2 mm or 41%, i.e., only 41% of the emitting area of the continuous wave electromagnetic radiation module is actually emitting continuous wave electromagnetic radiation, while 59% of the space or area on the face of the laser module remains dark. The dark areas are 1 cm long by 1.3 mm (2.2-0.9) wide. This leads to substantially empty areas where no continuous wave electromagnetic radiation is present.

In order to improve optical performance, the fill ratio may be increased by the interleave combiner 910B, thereby requiring a smaller subsequent series of lenses 910A (FIGS. 9A and 9B). In one embodiment, the interleave combiner 910B doubles the fill ratio. For example, continuous wave electromagnetic radiation outputs from the 4th and 5th laser diode modules are interleaved in between continuous wave electromagnetic radiation emitted from the 2nd and 3rd laser diode modules, as shown in FIG. 10. Accordingly, the total power output is that of five laser diode bars compressed into the space of three laser diode bars. This makes subsequent beam expansion and focusing easier so that suitably high power densities can be achieved. In one embodiment, the interleave combiner 910(B) uses multi-layer dielectric mirrors on a suitable optical glass, such as BK7 or fused silica, for enhanced reflection at continuous wave electromagnetic radiation wavelength.

Figure 11:
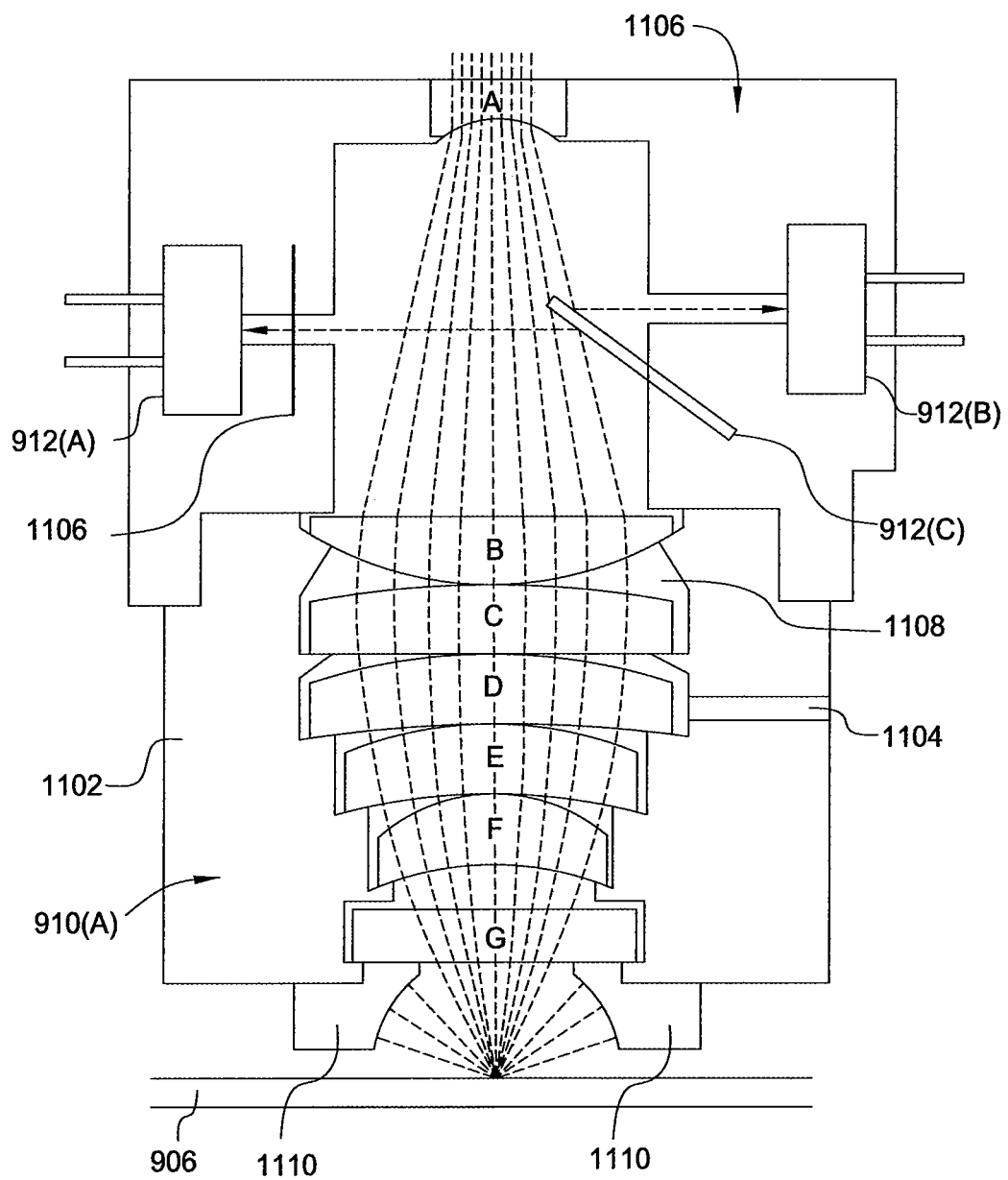
FIG. 11 is a more detailed sectional view of the focusing optics and the detection module shown in FIGS. 9A and 9B.

FIG. 11 is a more detailed sectional side view of the focusing optics 910A and the detection module 912A, 912B, and 912C. The purpose of the focusing optics 910A is to focus continuous wave electromagnetic radiation emitted from the continuous wave electromagnetic radiation source 908A and 908B (FIGS. 9A and 9B) into a line of continuous wave radiation on the surface of the substrate 906. In one embodiment, the focusing optics 910A include a series of seven lenses A-G. All of the lenses A-G may be cylindrical lenses having spherical, or Plano, figure.

Also in one embodiment, lens A is an expander lens that has a substantially optically flat entry side and a cylindrical exit side. The expander lens is used to expand the continuous wave electromagnetic radiation condensed by the interleave combiner 910(B) (FIGS. 9A and 9B) for subsequent focusing by the remainder of the focusing lenses B-G. For example, in one embodiment, the beam of continuous wave electromagnetic radiation is expanded to 20 mm wide and the fast axis divergence is reduced to less than 0.1°. The reduced divergence makes it possible to achieve a narrower line width. In addition, the wider beam makes it possible to achieve an acceptable working distance for a 0.4 numerical aperture. Once focused by the remainder of the lenses B-G, the resulting beam is approximately 30 microns wide at the surface of the substrate 906.

The lenses A-G may be held in place within the focusing optics 910A by a frame 1102. In one embodiment, the frame 1102 is made from machined stainless steel. The frame 1102 also also include some tolerances to ensure a robust system should the lenses not align in use, where any misalignment merely shifts the line of focus towards or away from the substrate surface (or it moves laterally). This shift in focus is then adjusted by an automated focusing system, as described below in relation to FIGS. 14A-D. In addition, during one use, purge gas is pumped into the frame and through a gas injector 1104 into spaces 1108 between the lenses to keep the lenses cool. This purge gas may be nitrogen, at room temperature (to avoid condensation forming on the lenses).

The detection module 912A, 912B, and 912C may include at least one reflected power detector 912A and at least one emitted power detector 912B. The at least one emitted power detector 912B is configured to detect a portion of the emitted continuous wave electromagnetic radiation emitted from the continuous wave electromagnetic radiation source 908A and 908B (FIGS. 9A and 9B), while the at least one reflected power detector 912A is configured to detect a portion of reflected continuous wave electromagnetic radiation reflected from the surface of the substrate 906. The emitted power detector 912B monitors the output of the continuous wave electromagnetic radiation source, while the reflected power detector 912A is used to detect reflectivity, emissivity, energy absorbed by the substrate, and/or the temperature of the substrate. Suitable emitted power detectors 912B and reflected power detectors 912A are made by Hamamatsu.

The beam splitter 912C is configured to sample a portion of the emitted continuous wave electromagnetic radiation by reflecting a portion of the emitted continuous wave electromagnetic radiation incident on a first substantially planar surface thereof towards the emitted power detector 912B. In one embodiment, a second planar surface (not shown) of the beam splitter 912C, opposite the first planar surface, is used to reflect continuous wave electromagnetic radiation reflected from the surface of the substrate towards the reflected power detector 912A. The beam splitter may be disposed between the continuous wave electromagnetic radiation source 908A and 908B and stage 904 (FIGS. 9A and 9B). The beam splitter 912C may also be coated with an anti-reflective coating, such as MgF. In use, the beam splitter 912C reflects or samples less than 1% of the continuous wave electromagnetic radiation emitted by the continuous wave electromagnetic radiation source 908A and 908B. In use, the ratio of the detected emitted power to the detected reflected power provides a measurement of the absorption at the substrate.

In one embodiment, the emitted power detector 912B and the reflected power detector 912A detect continuous wave electromagnetic radiation at 810 nm. In one embodiment, at least one reflected power detector 912A is configured as a temperature detector to detect the temperature on the surface of the substrate at the line of continuous wave electromagnetic radiation. To detect temperature, the temperature detector detects continuous wave electromagnetic radiation at a wavelength other than 810 nm, such as 1500 nm. This is achieved by positioning a filter 1106 between the reflected continuous wave electromagnetic radiation and the detector 912A. The filter 1106 is configured to allow only continuous wave electromagnetic radiation having a wavelength other than 810 nm to reach the detector 912A, thus making it act as an optical pyrometer. This assures that the detected signal is a reflection signal and not an emission from the light source. In other words, only radiation that is reflected has a wavelength of other than 810 nm. In one embodiment, the filter is configured to allow optical pyrometer operation between 900 nm and 2000 nm, with 1500 nm being the wavelength in one embodiment. This temperature measurement is, however, susceptible to emissivity variation.

The reflected power detector 912A and emitted power detector 912B also may include pinhole apertures to maximize the signal detected while minimizing the collection of any stray radiation that may be scattered within the optics due to the non-zero reflectivity of the lenses in the apparatus.

An alternative embodiment also includes reflectors 1110 positioned between the focusing optics 910A and the substrate 906. The reflectors 1110 are configured to reflect radiation reflected from the surface of the substrate back to the line of continuous wave electromagnetic radiation. In one embodiment, the reflectors 1110 are cylindrical mirrors with center of curvature at the focus of the lens.

Figure 12:
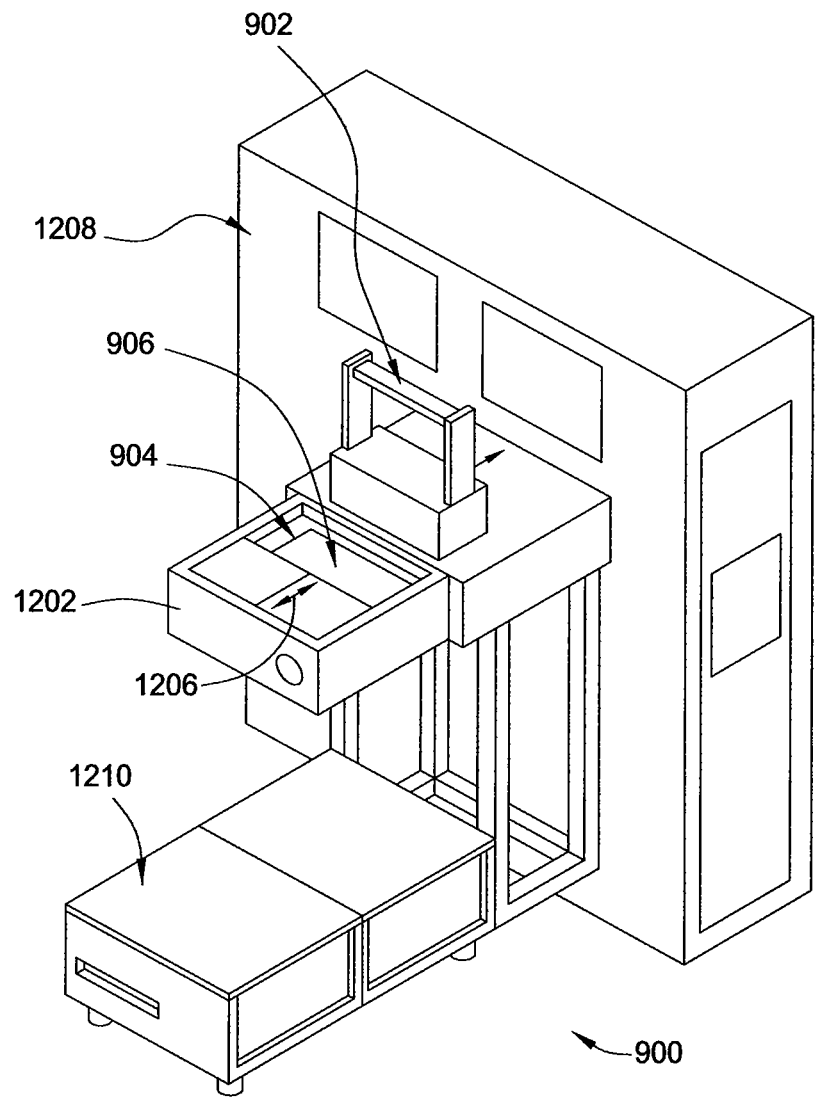
FIG. 12 is an isometric view of the apparatus shown in FIGS. 9A and 9B.

FIG. 12 is an isometric view of a prototype of the apparatus 900 shown in FIGS. 9A and 9B. As can be seen, a substrate, such as a semiconductor wafer, is positioned on a stage 904 within a chamber 1202. A continuous wave electromagnetic radiation module 902 is coupled to the chamber 1202. In addition, a translation mechanism, such as the translation mechanism 218 (FIG. 2), moves the stage 904 relative to the continuous wave electromagnetic radiation module 902, as depicted by the arrows 1206. Some of the electronics, such as the computer system 914 (FIGS. 9A and 9B), are contained within a housing 1210. The apparatus 900 may be coupled to factory interface 1208 for transferring substrates 906 into or out of the apparatus 900.

Figure 13:
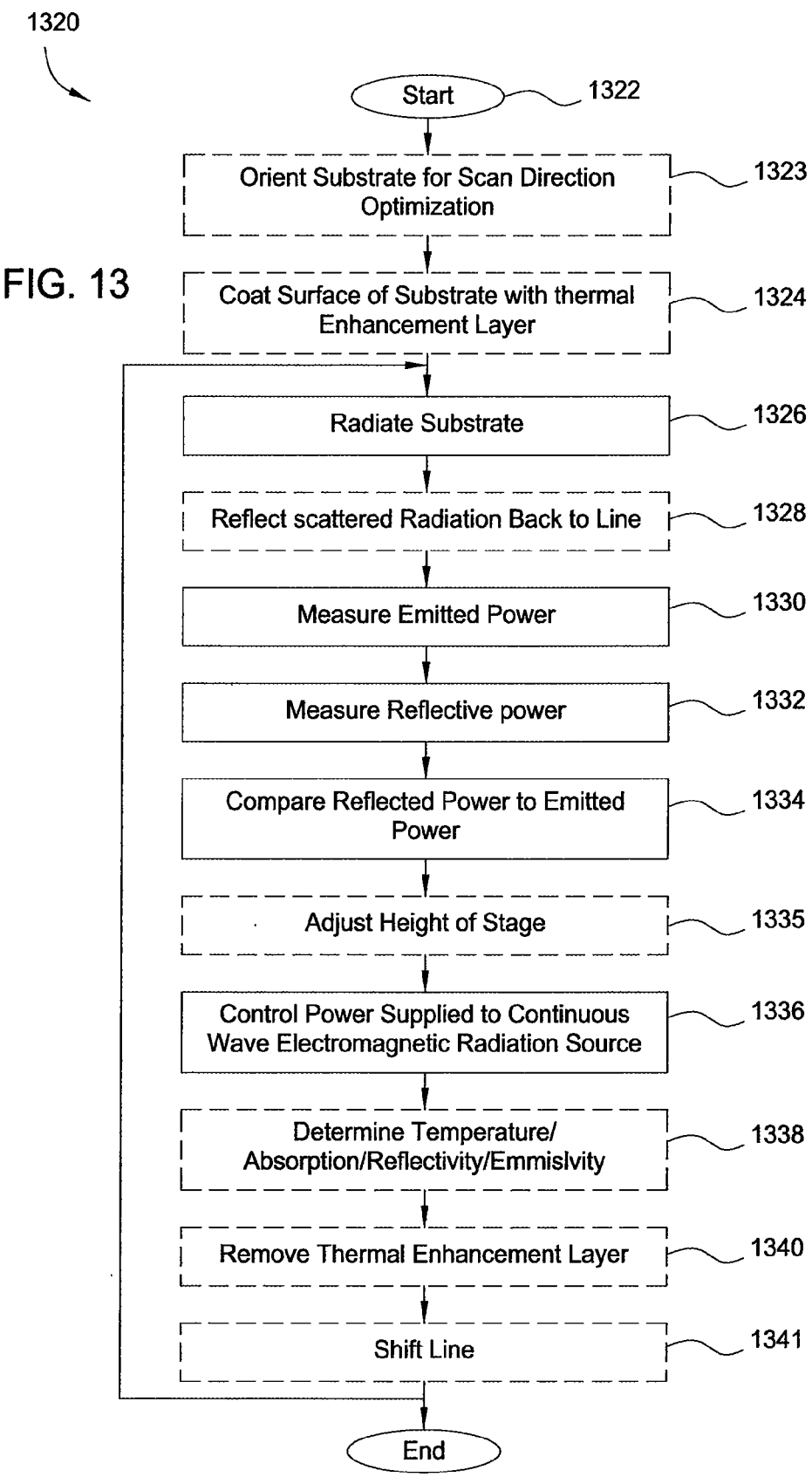
FIG. 13 is a flow chart of a method for controlling a thermal process.

FIG. 13 is a flow chart of a method 1320 for controlling a thermal process. Once the method 1320 has begun, at step 1322, the substrate is oriented on the stage, at step 1323, such that the subsequent direction of the scan will optimize the thermal process. This is undertaken, as different orientations of the substrate have different mechanical properties and the yield strength may be higher in one direction than another. In general, a notch is provided on the substrate to indicate crystallization direction. The surface of the substrate 904 (FIGS. 9A and 9B) may be optionally coated with a thermal enhancement layer at step 1324. The thermal enhancement layer is made from a material having high absorption properties, such as doped poly silicon or silicon nitride, on a buffer layer of oxide, and/or from a material having anti-reflective properties. The thermal enhancement layer helps create an insensitivity to substrate surface conditions. For example, if the surface of the substrate is highly reflective or non-uniform, the thermal enhancement layer helps maintain the substantially homogenous thermal exposure of the substrate.

The substrate is then irradiated with a line of continuous wave electromagnetic radiation emitted from the continuous wave radiation module 908 (FIGS. 9A and 9B), at step 1326, thereby heating the surface of a substrate with a predetermined power density for a predetermined length of time. The predetermined power density may be, for example, greater than 30 kW/cm$^2$. In one embodiment, the predetermined power density is about 100 kW/cm$^2$. The predetermined time may be, for example, between 100 microseconds and 100 milliseconds. In one embodiment, the predetermined time is about 1 millisecond, which heats the surface of the substrate from an ambient temperature of less than about 500° to a process temperature of higher than about 700° C. The temperature at a predetermined depth from the surface, such as at 10 times the maximum depth of device structures in silicon, remains below the ambient temperature plus half the process temperature less the ambient temperature. In the embodiment having reflectors 1110 (FIG. 11), any reflected or scattered light directed at the reflectors is reflected back towards the line of radiation at step 1328.

The emitted power is then measured by the emitted power detector(s) 912B and transmitted to the computer system 914 (FIG. 9A), at step 1330. The reflected power is then measured by the reflected power detector 912A and transmitted to the computer system 914, at step 1332. The computer system 914 then compares the reflected power to the emitted power, at step 1334, and controls the power supplied to the continuous wave electromagnetic radiation source accordingly, at step 1336. For example, the continuous wave electromagnetic radiation source may heat different substrates differently with the same emitted power. The computer system controls power of the power source 916, which in turn may control individual laser-diode modules, or sets of laser-diode modules, simultaneously. In this way, individual laser-diode modules, or combinations of laser-diode modules (or zones) may be controlled in real time.

In an alternative embodiment, based on the measured emitted power and reflected power, the adjustment mechanism (described below in relation to FIGS. 14A-D) can adjust the height of the stage in real time at step 1335. Adjusting the height of the stage can bring the surface of the substrate into or out of focus, thereby controlling the power density of the line of continuous wave electromagnetic radiation on the surface of the substrate independently from the total power.

The measured reflected power and emitted power may then be used to calculate reflectivity of the substrate, emissivity of the substrate, energy absorbed by the substrate, and/or the temperature of the substrate at step 1338. The reflectivity is proportional to the reflected power divided by the emitted power. A thermal emission signal from the substrate is measured through the optics and, optionally, through the interleave combiner at a wavelength longer than that of the continuous wave electromagnetic radiation source. Similarly, the temperature is proportional to the absorbed power, which equals the radiated power less the reflected power. The calculated true temperature is derived from the difference in reflected and emitted power subject to the calibration of the detectors.

If provided, the thermal enhancement layer is then typically removed, at step 1340. Furthermore, in an alternative embodiment, the thermal exposure uniformity can be improved by over-scanning. Over-scanning utilizes a line of radiation that is longer than the width of the substrate. After each scan, the line of radiation is shifted slightly along its length, at step 1341, such that the overall thermal uniformity is improved if slow axis uniformity degrades over time. The shifting of the line effectively averages out the thermal exposure of the substrate.

Figure 14:
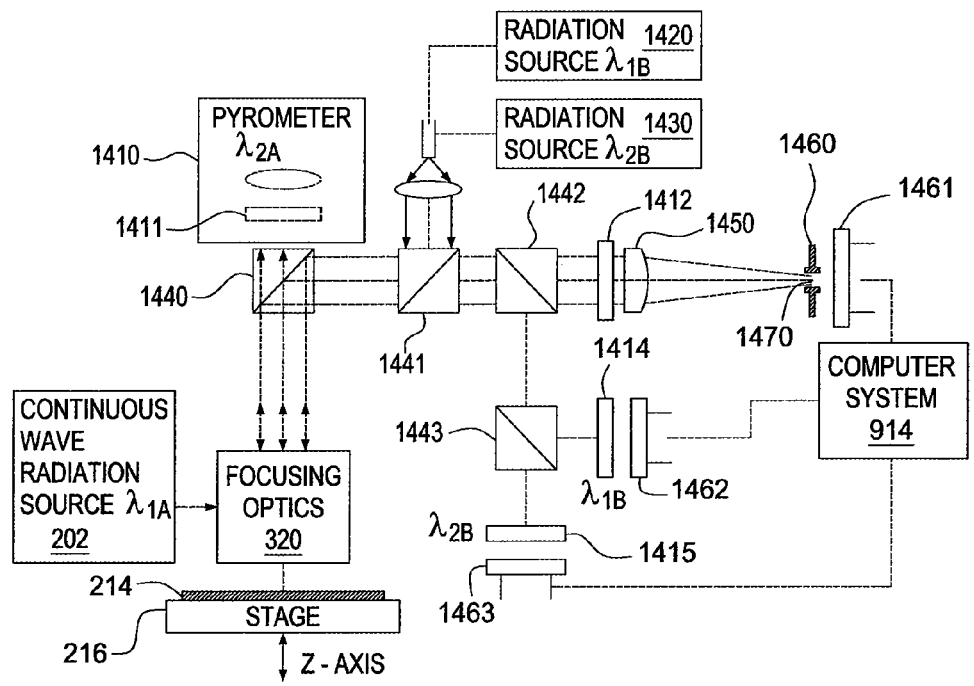
FIG. 14 is a schematic of an automatic focus arrangement for thermally processing a substrate in accordance with an embodiment of the invention.

In FIG. 14, a schematic of an automatic focus and emissivity measurement arrangement for thermally processing a substrate in accordance with an embodiment of the invention is shown. For clarity, only the components related to the automatic focus arrangement are shown in detail. The continuous wave radiation source 202 and the focusing optics 320 in the embodiment in FIG. 14 may be any of the above-mentioned arrangements for annealing the substrate 214, or any other laser annealing apparatus known in the art. For example, in one embodiment, the radiation source 202 is a laser, hereinafter the "heating laser." The embodiment in FIG. 14 further includes a pyrometer 1410, which is only schematically illustrated. The pyrometer 1410 may be configured, for example, as shown in the embodiment in FIG. 9 with a photodiode measuring a selected wavelength. For clarity, the wavelength of the heating laser 202 is designated as $\lambda_{1A}$ and the selected wavelength measured by the pyrometer 1410 is designated as $\lambda_{2A}$. The heating laser 202 wavelength $\lambda_{1A}$ may be, for example, about 808 nm. The pyrometer 1410 wavelength $\lambda_{1A}$ may be, for example, 950 nm.

The embodiment in FIG. 14 includes two low power radiation sources 1420 and 1430, which are configured to emit radiation onto the substrate 214. The low power radiation sources 1420 and 1430, may be lasers. Monitoring the reflection off the substrate 214 from the laser radiation emitted by the low power radiation sources 1420 and 1430 provides the capability to determine whether the heating laser 202 is in focus relative to the substrate 214 and to compensate for variations in emissivity of the substrate 214. The output of the low power radiation sources 1420 and 1430 is low relative to the heating laser 202 and may be sufficiently low so as to have a negligible effect on the heating of the substrate 214. For example, the low power radiation sources 1420 and 1430 may be less than 1 W. The wavelength $\lambda_{1B}$ of the low power radiation source 1420 may be selected to be close to, but not the same as, the wavelength $\lambda_{1A}$ of the heating laser 202. The wavelength $\lambda_{2B}$ of the low power radiation source 1430 may be close to, but not the same as, the wavelength $\lambda_{2A}$ of the pyrometer 1410. For example, the wavelengths $\lambda_{1B}$ and $\lambda_{2B}$ may be within 5 nm of the wavelengths $\lambda_{1A}$ and $\lambda_{2A}$, respectively. To avoid interference, the low power radiation sources 1420 and 1430 should not have the same wavelengths as the heating laser 202 and the pyrometer 1410. By being close in wavelength, the laser radiation from the low power radiation sources 1420 and 1430 will reflect off the substrate 214 similarly to that of the heating laser 202 and the wavelength monitored by the pyrometer 1410.

Continuing with FIG. 14, the low power radiation sources 1420 and 1430 are optically coupled to a beam splitter 1441, where the laser radiation continues through the focusing optics 320 onto the substrate 214. The laser radiation from the low power radiation sources 1420 and 1430 is partially reflected from the substrate 214. The amount of laser radiation reflected by the substrate 214 relative to the amount of laser radiation emitted from the low power radiation sources 1420 and 1430 is then determined. The amount of laser radiation absorbed from the heating laser 202 will be about (1−reflectivity) as determined at the wavelength $\lambda_{1B}$ of the low power radiation source 1420 because the wavelength $\lambda_{1B}$ of the low power radiation source 1420 is close to the heating laser wavelength $\lambda_{1A}$. Similarly, the emissivity of the substrate 214 at the pyrometer wavelength $\lambda_{2A}$ will be about (1−reflectivity) at the wavelength $\lambda_{2B}$ of the low power radiation source 1430 because the wavelength $\lambda_{2B}$ of the low power radiation source 1430 is close to the pyrometer wavelength $\lambda_{2A}$.

A portion of the laser radiation reflects off the substrate 214 and back through the focusing optics 320. A beam splitter 1440 directs a percentage of the reflected laser radiation to the pyrometer 1410, which measures the laser radiation at a selected wavelength that passes through band pass filter 1411. A beam splitter 1441 separates the remaining laser radiation into two pathways. One pathway determines whether the substrate 214 is at the focus plane of the focusing optics 320. The other pathway determines the reflectivity of the substrate 214 at wavelengths $\lambda_{1B}$ and $\lambda_{2B}$.

To determine reflectivity, a beam splitter 1443 separates the laser radiation into two pathways: one for determining reflectivity at wavelength $\lambda_{1B}$ and the other for determining reflectivity at wavelength $\lambda_{2B}$. Band pass filters 1414 and 1463, respectively, allow wavelengths $\lambda_{1B}$ and $\lambda_{2B}$ to pass through to photodiodes 1462 and 1463, which measure the intensity of laser radiation at the selected wavelengths. After correcting for losses and the percentage of total reflected laser radiation being measured after the series of beam splitters, the reflectivity of the substrate 214 is determined by computer system 914 from the measurements by the photodiodes 1462 and 1463. The reflectivity at wavelength $\lambda_{1B}$ allows for the computer system 914 to determine the absorption by the substrate 214 at the heating laser wavelength $\lambda_{1A}$. Variations in the absorption layer of the substrate 214 may cause the absorption to be higher or lower than the expected absorption at the heating laser wavelength $\lambda_{1A}$. From the absorption determination, the power for heating laser 202 can be adjusted to compensate: higher power for lower absorption and lower power for higher absorption.

The emissivity of the substrate 214 at the pyrometer wavelength $\lambda_{2A}$ may be determined from the reflectivity of the substrate 214 at the wavelength $\lambda_{2B}$ in a manner similar to the absorption determination described above. The reflectivity at wavelength $\lambda_{2B}$ allows for the computer system 914 to determine the emissivity of the substrate 214 at the pyrometer wavelength $\lambda_{2A}$. Variations in the absorption layer of the substrate 214 may cause the emissivity to be higher or lower than the expected emissivity at the pyrometer wavelength $\lambda_{2A}$. From the emissivity determination, the temperature measurement for the pyrometer 1410 may be adjusted. Specifically, a high emissivity would make the measured temperature higher than the actual temperature of substrate 214, and vice versa.

Turning to the automatic focus feature of the embodiment in FIG. 14, the beam splitter 1442 directs a portion of the reflected laser radiation through a band pass filter 1412, which may be configured to allow either wavelength $\lambda_{1B}$ or $\lambda_{2B}$ to pass through. A cylinder lens 1450 then focuses the filtered laser radiation onto an aperture plate 1460. The aperture plate 1460 includes an aperture 1470, which may be, for example, a pinhole or a slit. A photodiode 1461 measures the intensity of the laser radiation passing through the aperture plate 1460. The intensity of the laser radiation is greatest when the laser radiation is focused onto the aperture plate 1460, which is located to be in focus when the focus plane of the focusing optics 320 is properly on the substrate 214. If the substrate 214 is not aligned with the substrate 214, the amount of laser radiation transmitted through the aperture 1470 will be lower. The computer system 914 is configured to determine the amount of focus correction required based on the intensity measurement from the photodiode 1461. After determining that focus correction is required, the location of the focus plane relative to the substrate 214 is adjusted. The computer system 914 may be further configured to send movement commands to the stage 216 or to an objective lens in the focusing optics 320 to adjust the position of the focus plane relative to the substrate 214 along the z-axis.

Although the embodiment in FIG. 14 includes two low power lasers, at least some of the advantages of the automatic focus arrangement in FIG. 14 may be obtained with only one lower power radiation source. The low power radiation source may be configured to operate at a substantially constant power setting to provide a constant power output for comparing to photodiode measurements of reflected laser radiation. Because the heating laser operates at varying levels of power based on a particular thermal recipe for the substrate, the low power radiation source at a substantially constant power provides a better metric for determining emissivity and/or whether the focus plane and the substrate are aligned.

Figure 15:
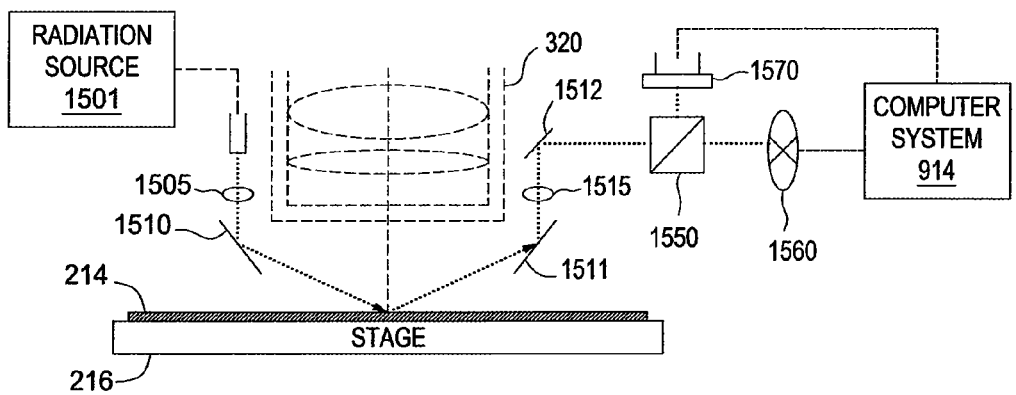
FIG. 15 is a schematic of an automatic focus arrangement for thermally processing a substrate in accordance with an embodiment of the invention.

In FIG. 15, a schematic of an automatic focus and emissivity measurement arrangement for a laser annealing apparatus in accordance with an embodiment of the invention is shown. The embodiment in FIG. 15 includes a low power radiation source 1501 located outside the focusing optics 320 of the heating laser. For clarity, the details regarding the arrangement of the heating laser and the pyrometer are not shown. Laser radiation from the low power radiation source 1501 is transmitted through a lens 1505 onto a mirror 1510. The mirror 1510 directs the laser radiation to impinge on the substrate 214 at an oblique angle. The point at which the laser radiation impinges on the substrate 214 corresponds to the focus plane of the focusing optics 320. A portion of the laser radiation not absorbed by the substrate 214 reflects off the substrate 214 at an equal oblique angle onto a mirror 1511 and through a lens 1515. An additional mirror 1512 may further reflect the laser radiation to a beam splitter 1550, which separates the reflected laser radiation into two pathways. One pathway includes a position-sensitive detector 1560, which communicates a focus signal to the computer system 914. The position-sensitive detector 1560 may be, for example, a set of photodiodes arranged around a center point. If the focus plane of the focusing optics 320 is aligned with the substrate 214, the laser radiation will be centered on the position-sensitive detector 1560. If out of focus, the laser radiation reflected off the mirror 1510 will reflect off the substrate 214 onto the center of mirror 1511, which will be detected by the position-sensitive detector 1560. The position of the reflected laser radiation on the position-sensitive detector 1560 will also be able to show whether the substrate 214 is above or below the focus plane. For the purpose of the focus signal, the wavelength of the low power radiation source 1501 is not important.

The other pathway from the beam splitter 1550 directs laser radiation to a photodiode 1570, which measures the intensity of the laser radiation. Emissivity may be determined by the computer system 914 in a similar manner to that of the embodiment in FIG. 14. The calculation of the emissivity must be adjusted to compensate for the oblique angle at which the laser radiation impinges on the substrate 214. The correction factor will vary according to the angle. The wavelength of the low power radiation source 1501 may be close to the wavelength of the heating laser if the intent is to determine absorption of the substrate 214 at the heating laser wavelength. If determination of emissivity at the pyrometer wavelength is desired, the wavelength of the low power radiation source 1501 may be close to the pyrometer wavelength. If both are desired, a second low power radiation source may be used in a similar manner.

While the foregoing is directed to embodiments of the invention, other and further embodiments of the invention may be devised without departing from the basic scope thereof, and the scope thereof is determined by the claims that follow.

What is claimed is:

1. An apparatus for thermally processing a substrate, comprising:
  a first radiation source configured to heat a substrate and emit radiation at a heating wavelength;
  a second radiation source configured to emit radiation at a second wavelength different from the heating wavelength and at a lower power than the first radiation source, wherein radiation from the second radiation source is directed onto the substrate;
  focusing optics configured to direct radiation from both the first radiation source and the second radiation source to the substrate;
  a first detector configured to receive reflected radiation at the second wavelength;
  a computer system configured to receive an output from the first detector and adjust a focus plane of the first radiation source relative to the substrate; and
  wherein the second radiation source is configured to have substantially the same focus plane as the first radiation source.

2. The apparatus of claim 1, wherein the first radiation source and the second radiation source are lasers.

3. The apparatus of claim 1, wherein the second wavelength is within about 5 nm of the heating wavelength.

4. The apparatus of claim 1, further comprising:
  a mirror positioned outside the focusing optics and configured to reflect radiation from the second radiation source at an oblique angle onto the substrate at the focus plane of the first radiation source.

5. The apparatus of claim 4, wherein the first detector is position sensitive.

6. The apparatus of claim 5, wherein the first detector comprises at least four photodiodes spaced equally apart.

7. The apparatus of claim 1, further comprising:
an aperture plate positioned proximate to the first detector.

8. The apparatus of claim 7, wherein the first detector is a photodiode.

9. The apparatus of claim 7, further comprising:
a beam splitter configured to separate the reflected radiation into at least a first pathway and a second pathway, wherein the first detector receives reflected radiation from the first pathway; and
a second detector configured to receive reflected radiation in the second pathway, wherein the computer system is configured to determine a reflectivity of the substrate at the heating wavelength from an output received from the second detector.

10. The apparatus of claim 9, further comprising:
a third radiation source configured to emit radiation at a third wavelength within about 5 nm of a pyrometer wavelength, wherein radiation from the third radiation source is directed onto the substrate; and
a third detector configured to receive reflected radiation, wherein the computer system is configured to determine an emissivity of the substrate at the pyrometer wavelength from an output received from the third detector.

11. The apparatus of claim 10, wherein at least one of the second radiation source and the third radiation source is configured to operate at a substantially constant power.

12. A method of thermally processing a substrate, comprising:
directing radiation at a first wavelength from a heating radiation source onto a substrate through a focusing optics;
directing radiation at a second wavelength from a low power radiation source onto the substrate through the focusing optics, wherein a focus plane of the low power radiation source corresponds to a focus plane of the heating radiation source;
measuring reflected radiation at the second wavelength reflected off the substrate; and
adjusting the position of a focus plane of the heating radiation source relative to the substrate in response to the measured reflected radiation at the second wavelength.

13. The method of claim 12, further comprising:
adjusting a power level of the heating radiation source in response to the measured reflected radiation at the second wavelength.

14. The method of claim 12, further comprising:
determining a temperature of the substrate from emitted radiation at a pyrometer wavelength;
directing radiation at a third wavelength from a second low power radiation source onto the substrate, wherein the third wavelength is within about 5 nm of the pyrometer wavelength;
measuring reflected radiation at the third wavelength reflected off the substrate; and
adjusting the determined temperature in response to the measured reflected radiation at the third wavelength.

15. The method of claim 12, wherein the heating radiation source and the low power radiation source are lasers.

16. An apparatus for thermally processing a substrate, comprising:
a first radiation source configured to heat a substrate and emit radiation at a heating wavelength;
a second radiation source configured to emit radiation at a second wavelength close to but not the same as the heating wavelength and at a lower power than the first radiation source;
focusing optics configured to direct radiation from both the first radiation source and the second radiation source to the substrate;
an aperture plate;
a first detector configured to receive reflected radiation at the second wavelength after passing through the aperture plate;
a computer system configured to receive an output from the first detector and adjust a focus plane of the first radiation source relative to the substrate; and
wherein the second radiation source is configured to have substantially the same focus plane as the first radiation source.

17. The apparatus of claim 16, further comprising;
a second detector configured to receive reflected radiation at the second wavelength, wherein the computer system is configured to receive an output from the second detector to determine a reflectivity of the substrate at the heating wavelength therefrom.

18. The apparatus of claim 17, wherein the computer system is further configured to adjust a power level of the first radiation source according to the determined reflectivity of the substrate at the heating wavelength.

19. The apparatus of claim 16, further comprising:
a pyrometer configured to receive emitted radiation from the substrate at a pyrometer wavelength;
a third radiation source configured to emit radiation at a third wavelength close to but not the same as the pyrometer wavelength;
a second detector configured to receive reflected radiation at the third wavelength, and
wherein the computer system is further configured to receive an output from the second detector and to determine an emissivity of the substrate at the pyrometer wavelength therefrom.

20. The apparatus of claim 19, wherein the computer system is further configured to calibrate the pyrometer according to the determined emissivity of the substrate at the pyrometer wavelength.

21. The apparatus of claim 16, wherein the first radiation source and the second radiation source are lasers.

* * * * *